(12) United States Patent
Zhang

(10) Patent No.: US 10,666,661 B2
(45) Date of Patent: May 26, 2020

(54) AUTHORIZATION PROCESSING METHOD AND DEVICE

(71) Applicant: Huawei Technologies Co., Ltd., Shenzhen (CA)

(72) Inventor: Yaoye Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 15/892,686

(22) Filed: Feb. 9, 2018

(65) Prior Publication Data
US 2018/0167397 A1    Jun. 14, 2018

Related U.S. Application Data

(63) Continuation of application No. PCT/CN2016/075488, filed on Mar. 3, 2016.

(30) Foreign Application Priority Data

Aug. 10, 2015    (CN) .......................... 2015 1 0486108

(51) Int. Cl.
*H04L 29/06*    (2006.01)
*G06F 15/16*    (2006.01)
(Continued)

(52) U.S. Cl.
CPC .......... *H04L 63/102* (2013.01); *H04L 63/126* (2013.01); *H04W 12/06* (2013.01); *H04W 12/08* (2013.01)

(58) Field of Classification Search
CPC .... H04L 63/102; H04L 63/126; H04W 12/06; H04W 12/08
(Continued)

(56) References Cited

U.S. PATENT DOCUMENTS 6,704,871 B1 * 3/2004 Kaplan .................. G06F 21/72
                                                          713/192
7,149,862 B2 * 12/2006 Tune ................... G06F 12/1441
                                                         711/163
(Continued)

FOREIGN PATENT DOCUMENTS

CN    102065430 A    5/2011
CN    102835137 A    12/2012
(Continued)

OTHER PUBLICATIONS

Open Mobile Alliance (OMA), "DRM Specification—SCE Extensions," Approved Version 1.0, Jul. 5, 2011, OMA-TS-SCE_DRM-V1_0-20110705-A, pp. 1-59.
(Continued)

*Primary Examiner* — Monjur Rahim
(74) *Attorney, Agent, or Firm* — Slater Matsil, LLP

(57) ABSTRACT

The present invention relates to an authorization processing method and a device. An authorization server receives an authorization update request including a first identifier of an access device; sends, to the access device, an authorization update response including signature request information, where the signature request information instructs the access device to sign verification information; receives a signature verification request sent by the access device, where the signature verification request includes the first identifier, the verification information, and a signature of the verification information; determines that the signature of the verification information in the signature verification request is valid; and updates the authorization relationship according to the first identifier.

20 Claims, 14 Drawing Sheets

(51) Int. Cl.
  *G06F 7/04* (2006.01)
  *H04W 12/06* (2009.01)
  *H04W 12/08* (2009.01)

(58) Field of Classification Search
  USPC .......................................................... 726/4
  See application file for complete search history.

(56) References Cited

U.S. PATENT DOCUMENTS

| | | | |
|---|---|---|---|
| 7,150,039 B2* | 12/2006 | Kusakabe | G06Q 20/341 726/9 |
| 7,437,569 B2* | 10/2008 | Le Quere | G06F 21/72 713/189 |
| 7,962,123 B1 | 6/2011 | Yegani et al. | |
| 9,077,709 B1 | 7/2015 | Dall et al. | |
| 2002/0051536 A1* | 5/2002 | Shirakawa | G06F 21/71 380/45 |
| 2002/0083317 A1* | 6/2002 | Ohta | H04L 9/0618 713/161 |
| 2002/0101995 A1* | 8/2002 | Hashimoto | G06F 9/30003 380/277 |
| 2002/0199100 A1* | 12/2002 | Nenashev | G06F 21/50 713/161 |
| 2003/0140245 A1* | 7/2003 | Dahan | G06F 9/30047 713/190 |
| 2003/0204743 A1* | 10/2003 | Devadas | G06F 21/31 726/9 |
| 2004/0093507 A1* | 5/2004 | Courcambeck | G06F 21/64 713/193 |
| 2004/0177269 A1* | 9/2004 | Belnet | G06F 12/1491 726/27 |
| 2004/0199787 A1* | 10/2004 | Hans | G06Q 20/341 726/27 |
| 2009/0260064 A1 | 10/2009 | McDowell et al. | |
| 2013/0036223 A1 | 2/2013 | Du et al. | |
| 2013/0291071 A1 | 10/2013 | Blom et al. | |
| 2014/0351403 A1 | 11/2014 | Lin et al. | |
| 2015/0039896 A1 | 2/2015 | Kolluru et al. | |
| 2015/0089593 A1 | 3/2015 | Herman et al. | |
| 2017/0201516 A1 | 7/2017 | Fu et al. | |

FOREIGN PATENT DOCUMENTS

| | | |
|---|---|---|
| CN | 103220670 A | 7/2013 |
| CN | 104184713 A | 12/2014 |
| CN | 104618366 A | 5/2015 |
| EP | 2367371 A1 | 9/2011 |
| KR | 20120139803 A | 12/2012 |

OTHER PUBLICATIONS

ONEM2M, "Functional Architecture," Technical Specification TS-0001-V1.6.1, Jan. 30, 2015, pp. 1-321.
ONEM2M, "Security Solutions," Technical Specification TS-0003-V1.0.1, Jan. 30, 2015, pp. 1-91.
ONEM2M, "Service Layer Core Protocol Specification," Technical Specification TS-0004-V1.0.1, Jan. 30, 2015, pp. 1-217.
Hardt, D., "The OAuth 2.0 Authorization Framework," Internet Engineering Task Force (IETF) Request for Comments 6749, Microsoft, Oct. 2012, pp. 1-76.
QUALCOMM Inc. (TIA) et al., "Discussion motivating use of persistent AE identifiers and relation to m2mServiceSubscription and credential IDSs", SEC-2014-0399-ON Persistent AE Identifiers, ONEM2M, vol. WG4-Security, SEC, No. conference=SEC 12 .2, Sep. 10, 2014, 19 pages.

* cited by examiner

Table 3 Authorization relationship mapping table resource and attribute

Table 8 Example of newly-added authorization relationship attribute of a resource Table 11 Example of an authorization relationship mapping table resource and an attribute

AUTHORIZATION PROCESSING METHOD AND DEVICE

CROSS-REFERENCE TO RELATED APPLICATIONS

This application is a continuation of International Application No. PCT/CN2016/075488, filed on Mar. 3, 2016, which claims priority to Chinese Patent Application No. 201510486108.0, filed on Aug. 10, 2015, both of which are hereby incorporated by reference in their entireties.

TECHNICAL FIELD

The present invention relates to the field of Machine-to-Machine communication technologies, and in particular, to an authorization processing method and a device.

BACKGROUND

Machine-to-Machine communication (M2M) is a network application and service whose core is intelligent machine interaction. In Machine-to-Machine communication, a wireless or wired communications module and application processing logic are embedded in a machine, so as to fulfill information-based requirements of a user for monitoring, commanding and dispatching, data collection and measurement, and the like. In an M2M system, various M2M devices such as various sensors directly access an M2M service platform using an M2M gateway, to implement various M2M services, for example, electricity meter reading and smart household. A service capability provided by the M2M service platform can be used to obtain data collected by an M2M device, or to perform control and management on an M2M device.

In an existing M2M specification, by using a RESTful (Representational State Transfer) architecture, any M2M device, M2M gateway, or M2M service platform and a service capability provided by them can be abstracted as resources and have unique resource identifiers, that is, URIs (Uniform Resource Identifier). A corresponding access right may be set for each accessed resource, and an access control policy resource such as an ACP (accessControlPolicy) resource is used, to implement an access control function of the system for an accessed resource.

When receiving a resource request message of an access device, a device to which an accessed resource belongs obtains a corresponding access control policy resource according to an access control policy identifier accessControlPolicyID of the accessed resource. Each access control rule of the access control policy resource may be considered as a 3-tuple <accessControlOriginators, accessControlContexts, accessControlOperations>, where accessControlOriginators indicates an identifier (which may be a CSE-ID, an AE-ID, or a serviceProvider domain, or may be all) of an access device that has operation permission; accessControlOperations indicates operation permission (which may include one or more of retrieve, create, update, delete, discovery, or notify) permitted by the rule; and accessControlContexts is optional and defines conditions, for example, being within a time range and being within a geographical region, for which accessControlOriginators has the operation permission specified in accessControlOperations. In an optional manner, a value of accessControlContexts may be null, that is, the conditions for the operation permission are not limited and described. The device to which the accessed resource belongs determines, according to whether the accessControlOriginators attribute in the obtained access control policy resource includes an identifier of the access device and whether the accessControlOperations attribute includes an operation requested by the access device on the accessed resource, whether the access device has a right to access the accessed resource. Only when both the two conditions are satisfied, it indicates that the access device passes an access control right check.

In the M2M system, the access device identifier is used to identify an identity of the access device. Specifically, the access device may be an application entity (AE) or a common services entity (CSE). The access device identifier is allocated by a common services entity with which the access device registers. That is, the access device identifier is allocated by a registrar CSE (which is uniformly referred to as a registrar). In a current system, when an allocated access device identifier of a same access device changes because the access device registers with different registrars, or for another reason, the access device cannot use an original access control policy configured for the access device in the M2M system. An AE is used as an example. When an AE registers with a CSE1 for a local ID, an AE-ID1 is allocated to the AE. After the AE is offline, and when the AE registers with a CSE2, an AE-ID2 is allocated to the AE. In this case, when the identifier of the AE in the M2M system changes, an original authorization relationship (for example, an ACP) associated with the AE-ID1 cannot be applied to the new AE-ID2, and an administrator needs to reset or add an ACP for the AE-ID2. This greatly affects service continuity and user experience of an M2M device. For example, in an M2M system, an ACP resource corresponding to a resource X is shown in the following table:

| accessControlOriginators | accessControlContexts | accessControlOperations |
|---|---|---|
| AE-ID1 | / | Retrieve/Create |

It can be learned from the table that an access device corresponding to the access device identifier AE-ID1 has a retrieve or create access right for the resource X. However, when the access device identifier allocated by the M2M system changes to the AE-ID2 for some reason, for example because the access device registers with another registrar, the ACP resource cannot be applied to the access device, and the access device cannot obtain the retrieve or create access right for the resource X.

SUMMARY

Embodiments of the present invention provide an authorization processing method and a device. In some embodiments, a technical problem that an access device cannot use an original authorization relationship when an identifier of the access device changes is resolved.

According to a first aspect, an embodiment of the present invention provides an authorization processing method in Machine-to-Machine communication. The method includes receiving a first authorization update request sent by an access device, where the first authorization update request includes a first identifier of the access device. The method also includes sending a first authorization update response to the access device, where the first authorization update response includes signature request information, and the signature request information instructs the access device to sign verification information. The method also includes receiving a signature verification request sent by the access device, where the signature verification request includes the first identifier, the verification information, and a signature of the verification information, and the signature of the verification information is generated by the access device by signing the verification information by using a key. The method also includes obtaining a stored first authorization relationship according to the verification information. The method also includes determining, according to the signature of the verification information in the received signature verification request and a signature of verification information stored in the first authorization relationship, that the signature of the verification information in the signature verification request is valid. The method also includes updating the first authorization relationship according to the first identifier.

With reference to the first aspect, in a first possible implementation of the first aspect, before the receiving a first authorization update request sent by an access device, the method further includes: receiving, by a resource server, a resource access request sent by the access device, where the resource access request includes the first identifier and an identifier of an accessed resource. The method also includes determining, by the resource server according to the first identifier and the identifier of the accessed resource, that the access device has no right to access a resource corresponding to the identifier of the accessed resource. The method also includes rejecting, by the resource server, the request of the access device for accessing the resource corresponding to the identifier of the accessed resource, and sending, to the access device, a resource access response including a redirection address, where the redirection address is an authorization update port address of an authorization server, so that the access device sends the first authorization update request to the authorization server according to the authorization update port address.

With reference to the first aspect or the first possible implementation of the first aspect, in a second possible implementation of the first aspect, the updating the first authorization relationship according to the first identifier includes changing a second identifier in the first authorization relationship to the first identifier, where the second identifier is an identifier that has been used by the access device.

With reference to the first aspect, the first possible implementation of the first aspect, or the second possible implementation of the first aspect, in a third possible implementation of the first aspect, before the receiving a first authorization update request sent by an access device, the method further includes performing initial authorization on access of the access device to the resource corresponding to the identifier of the accessed resource.

With reference to the third possible implementation of the first aspect, in a fourth possible implementation of the first aspect, the verification information is the second identifier stored by the access device, the signature verification request further includes a signature of the first identifier, and the signature of the first identifier is generated by the access device by signing the first identifier by using the key. After the determining that the signature of the verification information in the signature verification request is valid, the method further includes changing the signature of the verification information stored in the first authorization relationship to the signature of the first identifier.

With reference to the fourth possible implementation of the first aspect, in a fifth possible implementation of the first aspect, the performing initial authorization on access of the access device to the resource corresponding to the identifier of the accessed resource includes: sending a resource creation request to the resource server, where the resource creation request includes a preset access control policy and the identifier of the accessed resource, and the preset access control policy includes the second identifier; receiving a resource creation response sent by the resource server, where the resource creation response indicates that the resource server successfully creates the access control policy resource and successfully binds the access control policy resource to the resource corresponding to the identifier of the accessed resource, and the access control policy resource is used to record the preset access control policy; sending a signature request to the access device, where the signature request instructs the access device to sign the second identifier; receiving a signature response sent by the access device, where the signature response includes a signature of the second identifier; and storing the first authorization relationship, where the first authorization relationship includes a correspondence between the second identifier, the signature of the second identifier, and the identifier of the accessed resource.

With reference to any one of the second to the fifth possible implementations of the first aspect, in a sixth possible implementation of the first aspect, after the updating the first authorization relationship according to the first identifier, the method further includes sending a second authorization update request to the resource server, where the second authorization update request includes the first identifier, the second identifier, and the identifier of the accessed resource.

With reference to the third possible implementation of the first aspect, in a seventh possible implementation of the first aspect, the verification information is an authorization credential, and the first authorization update request further includes the authorization credential. Before the sending a first authorization update response to the access device, the method further includes: determining, according to the authorization credential, that the first authorization relationship including the authorization credential exists and that an access device identifier bound in the first authorization relationship is not the first identifier.

With reference to the seventh possible implementation of the first aspect, in an eighth possible implementation of the first aspect, the performing initial authorization on access of the access device to the resource corresponding to the identifier of the accessed resource includes: receiving an authorization request of the access device, where the authorization request includes the second identifier, the identifier of the accessed resource, and authentication information that a user consents to resource access of the access device; generating the authorization credential when it is determined, according to the authentication information, that the user has a right to access the resource corresponding to the identifier of the accessed resource; sending an authorization binding request to the resource server in which the resource corresponding to the identifier of the accessed resource is located, where the authorization binding request includes the second identifier, the authorization credential, and the identifier of the accessed resource; receiving an authorization binding response sent by the resource server, where the authorization binding response includes information indicating that binding the second identifier, the authorization credential, and the identifier of the accessed resource is successful; sending an authorization response to the access device, where the authorization response includes the authorization credential, the identifier of the accessed resource, and information instructing to sign the authorization credential; receiving a signature binding request sent by the access device, where the signature binding request includes the second identifier, the authorization credential, a signature of the authorization credential, and the identifier of the accessed resource, and the signature of the authorization credential is generated by the access device by signing the authorization credential by using the key; and storing the first authorization relationship, where the first authorization relationship includes a correspondence between the second identifier, the authorization credential, the signature of the authorization credential, and the identifier of the accessed resource.

With reference to the seventh or the eighth possible implementation of the first aspect, in a ninth possible implementation of the first aspect, after the updating the first authorization relationship according to the first identifier, the method further includes sending a second authorization update request to the resource server, where the second authorization update request includes the first identifier, the authorization credential, and the identifier of the accessed resource.

According to a second aspect, an authorization processing method in Machine-to-Machine communication is provided. The method includes receiving a first resource access request sent by an access device, where the first resource access request includes a first identifier of the access device, an identifier of an accessed resource, and an authorization credential. The method also includes determining, according to the authorization credential, that a second authorization relationship including the authorization credential and the identifier of the accessed resource exists, and that an access device identifier bound in the second authorization relationship is not the first identifier. The method also includes sending a first resource access response to the access device, where the first resource access response includes signature request information, and the signature request information instructs the access device to sign the authorization credential. The method also includes receiving a second resource access request sent by the access device, where the second resource access request includes the first identifier, the authorization credential, a signature of the authorization credential, and the identifier of the accessed resource, and the signature of the authorization credential is generated by the access device by signing the authorization credential by using a key. The method also includes sending a signature data request to an authorization server, where the signature data request includes the authorization credential. The method also includes receiving a signature data response sent by the authorization server, where the signature data response includes a signature of an authorization credential, and the signature of the authorization credential is stored in a first authorization relationship and is obtained by the authorization server according to the authorization credential. The method also includes determining, according to the signature of the authorization credential in the second resource access request and the signature of the authorization credential sent by the authorization server, that the signature of the authorization credential in the second resource access request is valid. The method also includes updating the second authorization relationship according to the first identifier.

With reference to the second aspect, in a first possible implementation of the second aspect, after the updating the second authorization relationship according to the first identifier, the method further includes: sending a second resource access response to the access device, where the second resource access response includes a resource corresponding to the identifier of the accessed resource.

With reference to the second aspect or the first possible implementation of the second aspect, in a second possible implementation of the second aspect, the updating the second authorization relationship according to the first identifier includes changing a second identifier in the second authorization relationship to the first identifier, where the second identifier is an identifier that has been used by the access device.

With reference to the second possible implementation of the second aspect, in a third possible implementation of the second aspect, before the receiving a first resource access request sent by an access device, the method further includes: receiving, by the authorization server, an authorization request sent by the access device, where the authorization request includes the second identifier, the identifier of the accessed resource, and authentication information that a user consents to resource access of the access device; determining, by the authorization server according to the authentication information, that the user has a right to access the resource corresponding to the identifier of the accessed resource, generating the authorization credential, and sending an authorization binding request to a resource server in which the resource corresponding to the identifier of the accessed resource is located, where the authorization binding request includes the second identifier, the authorization credential, and the identifier of the accessed resource; storing, by the resource server, a correspondence between the second identifier, the authorization credential, and the identifier of the accessed resource as the second authorization relationship, and sending an authorization binding response to the authorization server, where the authorization binding response includes information indicating that binding the second identifier, the authorization credential, and the identifier of the accessed resource is successful; sending, by the authorization server, an authorization response to the access device, where the authorization response includes the authorization credential, the identifier of the accessed resource, and information instructing to sign the authorization credential; receiving, by the authorization server, a signature binding request sent by the access device, where the signature binding request includes the second identifier, the authorization credential, the signature of the authorization credential, and the identifier of the accessed resource, and the signature of the authorization credential is generated by the access device by signing the authorization credential by using the key; and storing, by the authorization server, a correspondence between the second identifier, the authorization credential, the signature of the authorization credential, and the identifier of the accessed resource as the first authorization relationship.

With reference to any one of the second aspect, or the first to the third possible implementations of the second aspect, in a fourth possible implementation of the second aspect, after the determining that the signature of the authorization credential in the second resource access request is valid, the method further includes: sending a third authorization update request to the authorization server, where the third authorization update request includes the authorization credential and the first identifier. The method also includes receiving a third authorization update response sent by the authorization server, where the third authorization update response includes information indicating that the authorization server successfully performs authorization update.

According to a third aspect, an authorization server in Machine-to-Machine communication is further provided.

The server includes a receiving module, configured to receive a first authorization update request sent by an access device, where the first authorization update request includes a first identifier of the access device. The server also includes a sending module, configured to send a first authorization update response to the access device, where the first authorization update response includes signature request information, and the signature request information instructs the access device to sign verification information. The receiving module is further configured to receive a signature verification request sent by the access device, where the signature verification request includes the first identifier, the verification information, and a signature of the verification information, and the signature of the verification information is generated by the access device by signing the verification information by using a key. The server also includes an obtaining module, configured to obtain a stored first authorization relationship according to the verification information in the signature verification request received by the receiving module. The server also includes a determining module, configured to determine, according to the signature of the verification information in the received signature verification request and a signature of verification information stored in the first authorization relationship, that the signature of the verification information in the signature verification request is valid. The server also includes and an update module, configured to update the first authorization relationship according to the first identifier.

With reference to the third aspect, in a first possible implementation of the third aspect, the update module is specifically configured to change a second identifier in the first authorization relationship to the first identifier, where the second identifier is an identifier that has been used by the access device.

With reference to the third aspect or the first possible implementation of the third aspect, in a second possible implementation of the third aspect, the authorization server further includes an initial authorization module, configured to perform initial authorization on access of the access device to a resource corresponding to an identifier of an accessed resource.

With reference to the second possible implementation of the third aspect, in a third possible implementation of the third aspect, the verification information is the second identifier stored by the access device, the signature verification request further includes a signature of the first identifier, and the signature of the first identifier is generated by the access device by signing the first identifier by using the key. The update module is further configured to change the signature of the verification information stored in the first authorization relationship to the signature of the first identifier.

With reference to the third possible implementation of the third aspect, in a fourth possible implementation of the third aspect, the initial authorization module is specifically configured to: send a resource creation request to a resource server, where the resource creation request includes a preset access control policy and the identifier of the accessed resource, and the preset access control policy includes the second identifier; receive a resource creation response sent by the resource server, where the resource creation response indicates that the resource server successfully creates the access control policy resource and successfully binds the access control policy resource to the resource corresponding to the identifier of the accessed resource, and the access control policy resource is used to record the preset access control policy; send a signature request to the access device, where the signature request instructs the access device to sign the second identifier; receive a signature response sent by the access device, where the signature response includes a signature of the second identifier; and store the first authorization relationship, where the first authorization relationship includes a correspondence between the second identifier, the signature of the second identifier, and the identifier of the accessed resource.

With reference to any one of the first to the fourth possible implementations of the third aspect, in a fifth possible implementation of the third aspect, the sending module is further configured to send a second authorization update request to the resource server after the first authorization relationship is updated according to the first identifier, and the second authorization update request includes the first identifier and the identifier of the accessed resource.

With reference to the second possible implementation of the third aspect, in a sixth possible implementation of the third aspect, the verification information is an authorization credential, the first authorization update request further includes the authorization credential, and the determining module is further configured to determine, according to the authorization credential before the first authorization update response is sent to the access device, that the first authorization relationship including the authorization credential exists and that an access device identifier bound in the first authorization relationship is not the first identifier.

With reference to the sixth possible implementation of the third aspect, in a seventh possible implementation of the third aspect, the initial authorization module is configured to: receive an authorization request of the access device, where the authorization request includes the second identifier, the identifier of the accessed resource, and authentication information that a user consents to resource access of the access device; generate the authorization credential when it is determined, according to the authentication information, that the user has a right to access the resource corresponding to the identifier of the accessed resource; send an authorization binding request to a resource server in which the resource corresponding to the identifier of the accessed resource is located, where the authorization binding request includes the second identifier, the authorization credential, and the identifier of the accessed resource; receive an authorization binding response sent by the resource server, where the authorization binding response includes information indicating that binding the second identifier, the authorization credential, and the identifier of the accessed resource is successful; send an authorization response to the access device, where the authorization response includes the authorization credential, the identifier of the accessed resource, and information instructing to sign the authorization credential; receive a signature binding request sent by the access device, where the signature binding request includes the second identifier, the authorization credential, a signature of the authorization credential, and the identifier of the accessed resource, and the signature of the authorization credential is generated by the access device by signing the authorization credential by using the key; and store the first authorization relationship, where the first authorization relationship includes a correspondence between the second identifier, the authorization credential, the signature of the authorization credential, and the identifier of the accessed resource.

With reference to the sixth or the seventh possible implementation of the third aspect, in an eighth possible implementation of the third aspect, the sending module is further configured to send a second authorization update request to the resource server after the first authorization relationship is updated according to the first identifier, and the second authorization update request includes the first identifier, the authorization credential, and the identifier of the accessed resource.

According to a fourth aspect, a resource server in Machine-to-Machine communication is further provided. The server includes a receiving module, configured to receive a first resource access request sent by an access device, where the first resource access request includes a first identifier of the access device, an identifier of an accessed resource, and an authorization credential. The server also includes a determining module, configured to determine, according to the authorization credential, that a second authorization relationship including the authorization credential and the identifier of the accessed resource exists and that an access device identifier bound in the second authorization relationship is not the first identifier. The server also includes a sending module, configured to send a first resource access response to the access device, where the first resource access response includes signature request information, and the signature request information instructs the access device to sign the authorization credential. The receiving module is further configured to receive a second resource access request sent by the access device, where the second resource access request includes the first identifier, the authorization credential, a signature of the authorization credential, and the identifier of the accessed resource, and the signature of the authorization credential is generated by the access device by signing the authorization credential by using a key. The sending module is further configured to send a signature data request to an authorization server, where the signature data request includes the authorization credential. The receiving module is further configured to receive a signature data response sent by the authorization server, where the signature data response includes a signature of an authorization credential, and the signature of the authorization credential is stored in a first authorization relationship and is obtained by the authorization server according to the authorization credential. The determining module is further configured to determine, according to the signature of the authorization credential in the second resource access request and the signature of the authorization credential sent by the authorization server, that the signature of the authorization credential in the second resource access request is valid. The server also includes an update module, configured to update the second authorization relationship according to the first identifier.

With reference to the fourth aspect, in a first possible implementation of the fourth aspect, the sending module is further configured to send a second resource access response to the access device after the second authorization relationship is updated according to the first identifier, where the second resource access response includes a resource corresponding to the identifier of the accessed resource.

With reference to the fourth aspect or the first possible implementation of the fourth aspect, in a second possible implementation of the fourth aspect, the update module is configured to change a second identifier in the second authorization relationship to the first identifier, where the second identifier is an identifier that has been used by the access device.

With reference to the second possible implementation of the fourth aspect, in a third possible implementation of the fourth aspect, the receiving module is further configured to receive an authorization binding request that is sent after the authorization server performs initial authorization on access of the access device to the resource corresponding to the identifier of the accessed resource, and the authorization binding request includes the second identifier, the authorization credential, and the identifier of the accessed resource. A storage module is configured to store a correspondence between the second identifier, the authorization credential, and the identifier of the accessed resource as the second authorization relationship.

According to the technical solutions provided in embodiments of the present invention, when the identifier of the access device in an M2M system changes for a reason, the M2M system can identify an identity of the access device by determining whether the signature of the verification information is valid. For example, the M2M can compare whether the signature of the verification information sent by the access device is the same as the signature of the verification information in the first authorization relationship stored by the authorization server. The M2M system can update an existing authorization relationship, so that the access device can continue to use the existing authorization relationship. Therefore, seamless resource access is implemented, and service continuity of the M2M system is ensured.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings. To understand the present invention comprehensively, the following detailed description mentions many specific details. However, a person skilled in the art should understand that the present invention may be implemented without these specific details. In other embodiments, well-known methods, processes, components, and circuits are not described in detail, so as to prevent the embodiments from being blurred. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be noted that related functions of an authorization server and a resource server described in the embodiments of the present invention may be implemented by different function modules in a same device or may be separately implemented by different devices. This is not limited in the present invention.

In addition, some procedures described below include multiple operations appearing according to a specific sequence. However, it should be clearly understood that these operations may not be performed according to the sequence appearing in this specification or performed in parallel. Operation serial numbers such as 101 and 102 are merely used to differentiate operations, and the serial numbers do not indicate any execution sequence. In addition, these procedures may include more or fewer operations, and these operations may be performed according to a sequence or performed in parallel. It should be noted that descriptions such as "first" and "second" in this specification are used to differentiate messages, devices, modules, or the like, and do not indicate a sequence. In addition, the "first" and the "second" do not indicate different types.

Figure 1:
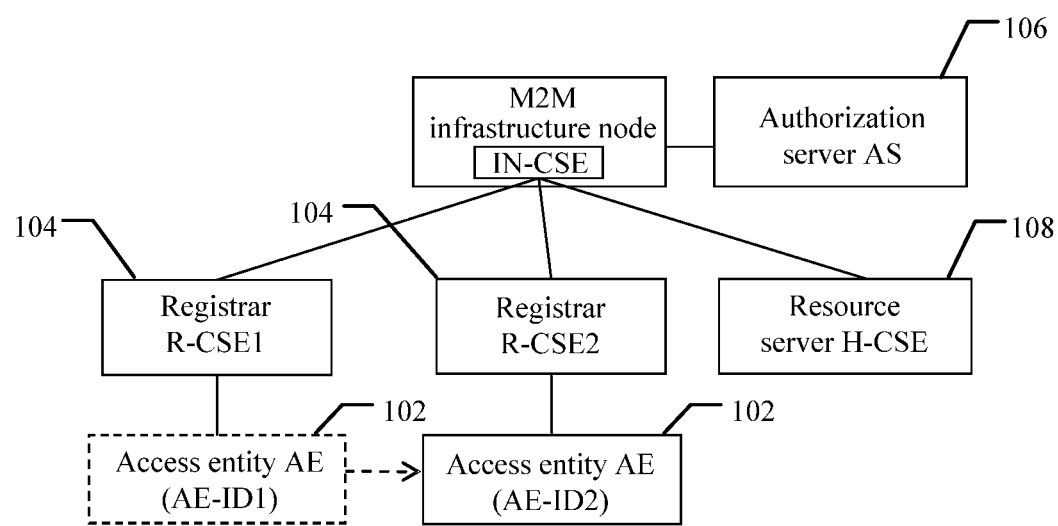
FIG. 1 is a block diagram of an authorization update system according to an embodiment of the present invention.

FIG. 1 is a block diagram of an authorization update system according to an embodiment of the present invention. The system includes multiple communications devices that communicate with each other by using a wired or wireless communications network.

An access device 102 may be an application entity (AE) or may be a common services entity (CSE). Access device 102 accesses an M2M system by using a registrar 104, and can access a resource managed by another entity in the M2M system.

The registrar 104 is a common services entity (Registrar CSE, R-CSE) providing a registration service for the access device 102 in the M2M system, and is responsible for providing registration for the access device 102 and allocating an entity identifier (Application Entity-Identifier, AE-ID/Common Services Entity-Identifier, CSE-ID) to the access device 102. The entity identifier is used as an identity identifier of the access device.

An authorization server 106 may be a common services entity (Infrastructure Node-CSE, IN-CSE) that resides in an infrastructure node (IN), or may be an authorization server (AS) that independently runs and that is connected to the IN-CSE, and is responsible for storing an authorization relationship in the M2M system and maintaining a correspondence between the access device, identity verification information of the access device, a signature of the verification information, and an identifier of an accessed resource.

A resource server 108 is usually a common services entity (Hosting CSE, H-CSE) of a node on which the accessed resource is located. Resource server 108 maintains a corresponding authorization relationship of a local resource, makes an access control decision according to a resource access request sent by the access device 102, and returns a resource access response to the access device according to a decision result.

It should be noted that embodiments of the present invention relate to two authorization relationships. One is maintained by the authorization server and is referred to as a first authorization relationship. The other is maintained by the resource server and is referred to as a second authorization relationship. In addition, embodiments of the present invention further relate to two access device identifiers, that is, a first identifier and a second identifier. The second identifier is an identifier that has been used by the access device, an authorization relationship related to the second identifier is maintained in the authorization server and the resource server, and the second identifier is marked as an AE-ID1 in the following embodiments of the present invention. The first identifier is an identifier obtained by the access device after re-registration, and the first identifier is marked as an AE-ID2 in the following embodiments of the present invention. According to a current system, when the access device accesses a resource by using the first identifier, an access request of the access device is to be rejected and the access terminates. Embodiments of the present invention describe a method for updating the second identifier in the first authorization relationship and the second authorization relationship to the first identifier, so that the access device can continue to use an original authorization relationship to obtain a resource access right. According to the method, a user can seamlessly access a corresponding resource using the access device, without re-creating a corresponding authorization relationship. This greatly facilitates resource access of the access device. For example, it can be learned, according to a protocol related to OAuth 2.0, that establishment of a token-based authorization relationship requires a resource possessor to perform online authorization. When the resource possessor is not online, the M2M system cannot perform re-authorization on the access device. Therefore, the user cannot access the resource.

In this embodiment of the present invention, the authorization server 106 stores an authorization relationship of a correspondence between an access device identifier, the identifier of the accessed resource, the verification information of the access device, and the signature of the verification information. Specifically, when performing initial authorization on the access device 102, the authorization server 106 obtains the signature of the verification information from the access device 102, and stores, in the authorization relationship, the signature of the verification information together with the corresponding access device identifier, verification information, and identifier of the accessed resource. The authorization server 106 may confirm an original identity of the access device 102 after receiving a signature verification request sent by the access device 102. Alternatively, the authorization server 106 may send the signature of the verification information to the resource server 108 when receiving a signature request sent by the resource server 108, and the resource server 108 confirms an original identity of the access device 102.

The resource server 108 is a common services entity of a node on which a resource is located. The resource server 108 may reside in a middle node (MN), an infrastructure node (IN), or an application service node (ASN) in the M2M system. In embodiments of the present invention, determining logic for authorization update processing is added to an original access control decision module in the resource server 108, and is configured to: when a result of the access control decision made according to the resource access request sent by the access device 102 is unauthorized, start local authorization update or redirect the resource access request to the authorization server 106 to perform the authorization update. In addition, in an embodiment of the present invention, the resource server 108 obtains the signature of the verification information from the authorization server 106 and obtains a signature of corresponding verification information from the access device 102, to complete confirmation of the original identity of the access device. After the confirmation of the original identity of the access device 102 is completed, the authorization server 106 proactively updates a local authorization relationship, or the resource server 108 updates a local authorization relationship under an instruction of the authorization server 106.

The access device 102 may be an application entity (AE) or a common services entity (CSE), and accesses the M2M system by using the registrar 104. In embodiments of the present invention, a signing module is added to the access device 102, and is configured to: when receiving a signature request from the authorization server 106 or the resource server 108, use a key to sign corresponding information and return a signature of the information to the authorization server 106 or the resource server 108. It should be noted that the key used by the access device for the signing may be set at delivery of the device, or may be generated in another manner. A specific form of the key is not limited in the present invention.

The registrar 104 may be an MN-CSE, or may be an IN-CSE or an ASN-CSE, and is responsible for allocating an identifier to the access device 102.

In addition, it should be noted that, in the M2M system, the resource server 108 and the authorization server 106 may be used as two functional modules in a device, or may be used as two devices that run independently in the M2M system. When the resource server 108 and the authorization server 106 are used as two functional modules in a device, information exchange between the resource server 108 and the authorization server 106 is considered as information exchange inside the device. Specific representation forms of the resource server 108 and the authorization server 106 are not limited in the present invention. For example, in the following embodiments of the present invention, the resource server 108 and the authorization server 106 are described as two devices that run independently.

An authorization architecture in FIG. 1 is merely an example in which an access device identifier changes (an AE successively registers with registrars R-CSE1 and R-CSE2, and different AE-IDs are allocated). Depending on a different access device identifier allocation manner, the access device identifier may change in another case. For example, the access device identifier may change when the access device registers with a same registrar, but an original identifier of the access device has been allocated to another entity. In addition, the resource server 108 and the registrar 104 may be directly connected to the IN-CSE, or may be connected to the IN-CSE by means of multiple hops of other CSEs. A specific structure of the M2M system is not limited.

The following describes in detail, with reference to the accompanying drawings, implementation of an authorization processing method and a device related to this application.

Figure 2:
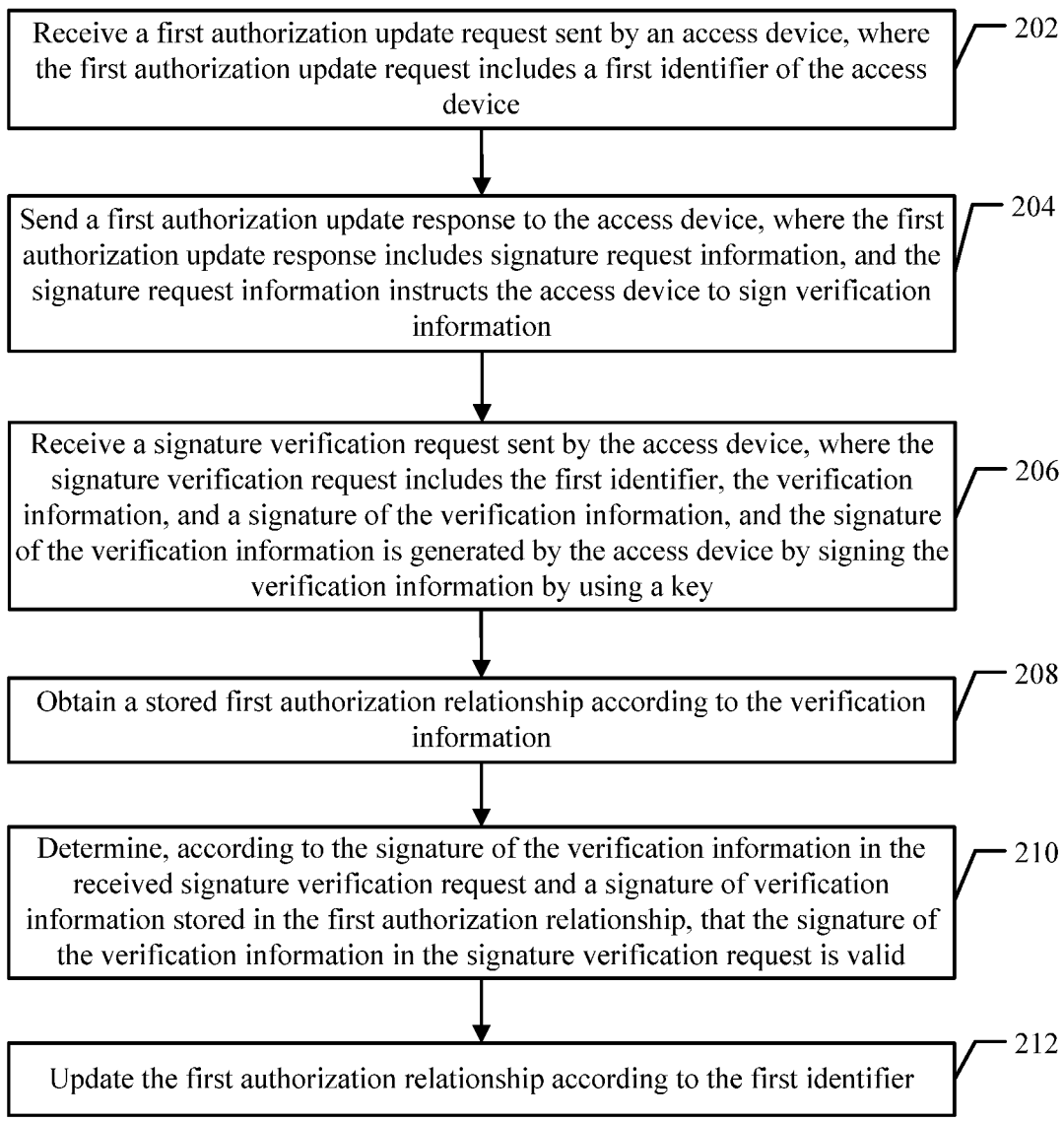
FIG. 2 is a flowchart of an authorization processing method in Machine-to-Machine communication according to an embodiment of the present invention.

FIG. 2 is a flowchart of an authorization processing method in Machine-to-Machine communication according to the present invention. The method includes the following steps.

Step 202: Receive a first authorization update request sent by an access device, where the first authorization update request includes a first identifier of the access device.

Optionally, a destination address of the first authorization update request may be an authorization update port of an authorization server. That is, the authorization server receives, by using the authorization update port, the first authorization update request sent by the access device. Optionally, the first authorization update request further includes an identifier of an accessed resource.

Step 204: Send a first authorization update response to the access device, where the first authorization update response includes signature request information, and the signature request information instructs the access device to sign verification information.

Optionally, the signature request information may be a signature flag bit. When a value of the signature flag bit is "1", it indicates that the access device needs to sign the verification information; or when a value of the signature flag bit is "2", it indicates that the access device needs to sign the verification information and a current identifier of the access device.

Step 206: Receive a signature verification request sent by the access device, where the signature verification request includes the first identifier, the verification information, and a signature of the verification information, and the signature of the verification information is generated by the access device by signing the verification information by using a key.

Step 208: Obtain a stored first authorization relationship according to the verification information.

Step 210: Determine, according to the signature of the verification information in the received signature verification request and a signature of verification information stored in the first authorization relationship, that the signature of the verification information in the signature verification request is valid.

In an embodiment, the authorization server obtains the signature of the verification information stored in the first authorization relationship, compares the signature of the verification information stored in the first authorization relationship with the signature of the verification information in the received signature verification request, and determines, when the signature of the verification information stored in the first authorization relationship is the same as the signature of the verification information in the received signature verification request, that the signature of the verification information in the signature verification request is valid.

Step 212: Update the first authorization relationship according to the first identifier.

Specifically, after determining that the signature of the verification information in the signature verification request is valid, the authorization server determines that the identifier of the access device has already been updated to the first identifier. Therefore, the authorization server needs to update an authorization relationship that is locally stored and that is related to the access device.

Optionally, the updating the first authorization relationship according to the first identifier includes: changing a second identifier in the first authorization relationship to the first identifier, where the second identifier is an identifier that has been used by the access device; or deleting the first authorization relationship, and creating a new authorization relationship, where the new authorization relationship includes the first identifier, the verification information in the first authorization relationship, and the signature of the verification information in the first authorization relationship.

In an embodiment, before step 202, the method further includes: receiving, by a resource server, a resource access request sent by the access device, where the resource access request includes the first identifier and the identifier of the accessed resource; determining, by the resource server according to the first identifier and the identifier of the accessed resource, that the access device has no right to access a resource corresponding to the identifier of the accessed resource; and rejecting, by the resource server, the request of the access device for accessing the resource corresponding to the identifier of the accessed resource, and sending, to the access device, a resource access response including a redirection address, where the redirection address is an authorization update port address of the authorization server, so that the access device sends the first authorization update request to the authorization server according to the authorization update port address.

In an embodiment, before the receiving a first authorization update request sent by an access device, the method further includes performing, by the authorization server, initial authorization on access of the access device to the resource corresponding to the identifier of the accessed resource.

When an ACP authorization architecture is used in an M2M system, the verification information may be the second identifier. When the verification information is the second identifier, the authorization server stores the first authorization relationship corresponding to the second identifier, a signature of the second identifier, and the identifier of the accessed resource, and the resource server stores a second authorization relationship corresponding to the second identifier and the identifier of the accessed resource. Specifically, when the verification information is the second identifier, the signature verification request further includes a signature of the first identifier, and the signature of the first identifier is generated by the access device by signing the first identifier by using the key. After step 210, that is, the determining that the signature of the verification information in the signature verification request is valid, the method further includes: changing the signature of the verification information stored in the first authorization relationship to the signature of the first identifier. The performing, by the authorization server, initial authorization on access of the access device to the resource corresponding to the identifier of the accessed resource includes: sending a resource creation request to the resource server, where the resource creation request includes a preset access control policy and the identifier of the accessed resource, the preset access control policy includes the second identifier, so that the resource server sets an access control policy resource according to the preset access control policy and binds the access control policy resource to the resource corresponding to the identifier of the accessed resource, and the access control policy resource includes the second identifier. The performing, by the authorization server, initial authorization on access of the access device to the resource corresponding to the identifier of the accessed resource also includes: receiving a resource creation response sent by the resource server, where the resource creation response indicates that the resource server successfully creates the access control policy resource and successfully binds the access control policy resource to the resource corresponding to the identifier of the accessed resource, and the access control policy resource is used to record the preset access control policy. The performing, by the authorization server, initial authorization on access of the access device to the resource corresponding to the identifier of the accessed resource also includes: sending a signature request to the access device, where the signature request instructs the access device to sign the second identifier; receiving a signature response sent by the access device, where the signature response includes the signature of the second identifier; and storing the first authorization relationship, where the first authorization relationship includes a correspondence between the second identifier, the signature of the second identifier, and the identifier of the accessed resource. It should be noted that a possible implementation of creating, by an administrator, the preset access control policy on the authorization server is that an access device 102 registers with a registrar 104 and generates registration information, where the registration information includes an identifier allocated by the registrar (for example, the second identifier) and information reflecting a feature of the access device (for example, content such as an IP address, a MAC address, or device description information of the access device), and the administrator obtains the registration information after logging in to the authorization server and creates the access control policy according to the registration information. That is, the administrator creates a rule that allows an access device to access a resource. Further, after step 212, the method further includes updating the second authorization relationship stored by the resource server. Specifically, after the updating the first authorization relationship according to the first identifier, the method further includes: sending a second authorization update request to the resource server, where the second authorization update request includes the first identifier, the second identifier, and the identifier of the accessed resource, so that the resource server obtains the stored second authorization relationship according to the second identifier and the identifier of the accessed resource and updates the second identifier in the stored second authorization relationship to the first identifier. Optionally, the authorization server receives a second authorization update response sent by the resource server, where the second authorization update response indicates that updating the second authorization relationship is successful.

It should be noted that, based on the ACP authorization architecture, the verification information may be sent by the authorization server to the access device using the first authorization update response after the authorization server receives the first authorization update request of the access device, or the verification information may be stored in the access device. For example, in an embodiment of the present invention, the second identifier is used as the verification information and is stored in the access device. However, this is not limited in the present invention.

When an OAuth authorization architecture is used in the M2M system, the verification information may be an authorization credential. The authorization server stores the first authorization relationship corresponding to the second identifier, the authorization credential, a signature of the authorization credential, and the identifier of the accessed resource, and the resource server stores a second authorization relationship corresponding to the second identifier, the authorization credential, and the identifier of the accessed resource. Specifically, when the verification information is the authorization credential, the first authorization update request further includes the authorization credential, and before step 204, that is, the sending a first authorization update response to the access device, the method further includes: determining, according to the authorization credential, that the first authorization relationship including the authorization credential exists and that an access device identifier bound in the first authorization relationship is not the first identifier.

The performing initial authorization on access of the access device to the resource corresponding to the identifier of the accessed resource includes: receiving an authorization request of the access device, where the authorization request includes the second identifier, the identifier of the accessed resource, and authentication information that a user consents to resource access of the access device; generating the authorization credential when it is determined, according to the authentication information, that the user has a right to access the resource corresponding to the identifier of the accessed resource; sending an authorization binding request to the resource server in which the resource corresponding to the identifier of the accessed resource is located, where the authorization binding request includes the second identifier, the authorization credential, and the identifier of the accessed resource; receiving an authorization binding response sent by the resource server, where the authorization binding response includes information indicating that binding the second identifier, the authorization credential, and the identifier of the accessed resource is successful; sending an authorization response to the access device, where the authorization response includes the authorization credential, the identifier of the accessed resource, and information instructing to sign the authorization credential; receiving a signature binding request sent by the access device, where the signature binding request includes the second identifier, the authorization credential, the signature of the authorization credential, and the identifier of the accessed resource, and the signature of the authorization credential is generated by the access device by signing the authorization credential by using the key; and storing the first authorization relationship, where the first authorization relationship includes a correspondence between the second identifier, the authorization credential, the signature of the authorization credential, and the identifier of the accessed resource. Further, after step 212, the method further includes updating the second authorization relationship stored by the resource server. Specifically, after the updating the first authorization relationship according to the first identifier, the method further includes: sending a second authorization update request to the resource server, where the second authorization update request includes the first identifier, the authorization credential, and the identifier of the accessed resource, so that the resource server obtains the stored second authorization relationship according to the authorization credential and the identifier of the accessed resource, and updates the second identifier in the second authorization relationship to the first identifier. Optionally, the authorization server receives a second authorization update response sent by the resource server, where the second authorization update response indicates that updating the second authorization relationship is successful.

After the resource server updates the second identifier in the stored second authorization relationship to the first identifier, the access device can use an original authorization relationship, thereby implementing the resource access.

This embodiment of the present invention provides the authorization processing method in Machine-to-Machine communication. When the identifier of the access device in the M2M system changes for a reason, the M2M system can identify an identity of the access device by determining whether the signature of the verification information is valid. For example, the M@M can determine whether the signature of the verification information is valid by comparing whether the signature of the verification information sent by the access device is the same as the signature of the verification information in the first authorization relationship stored by the authorization server. The M2M system can further update an existing authorization relationship, so that the access device can continue to use the existing authorization relationship. Therefore, seamless resource access is implemented, and service continuity of the M2M system is ensured.

Figure 3:
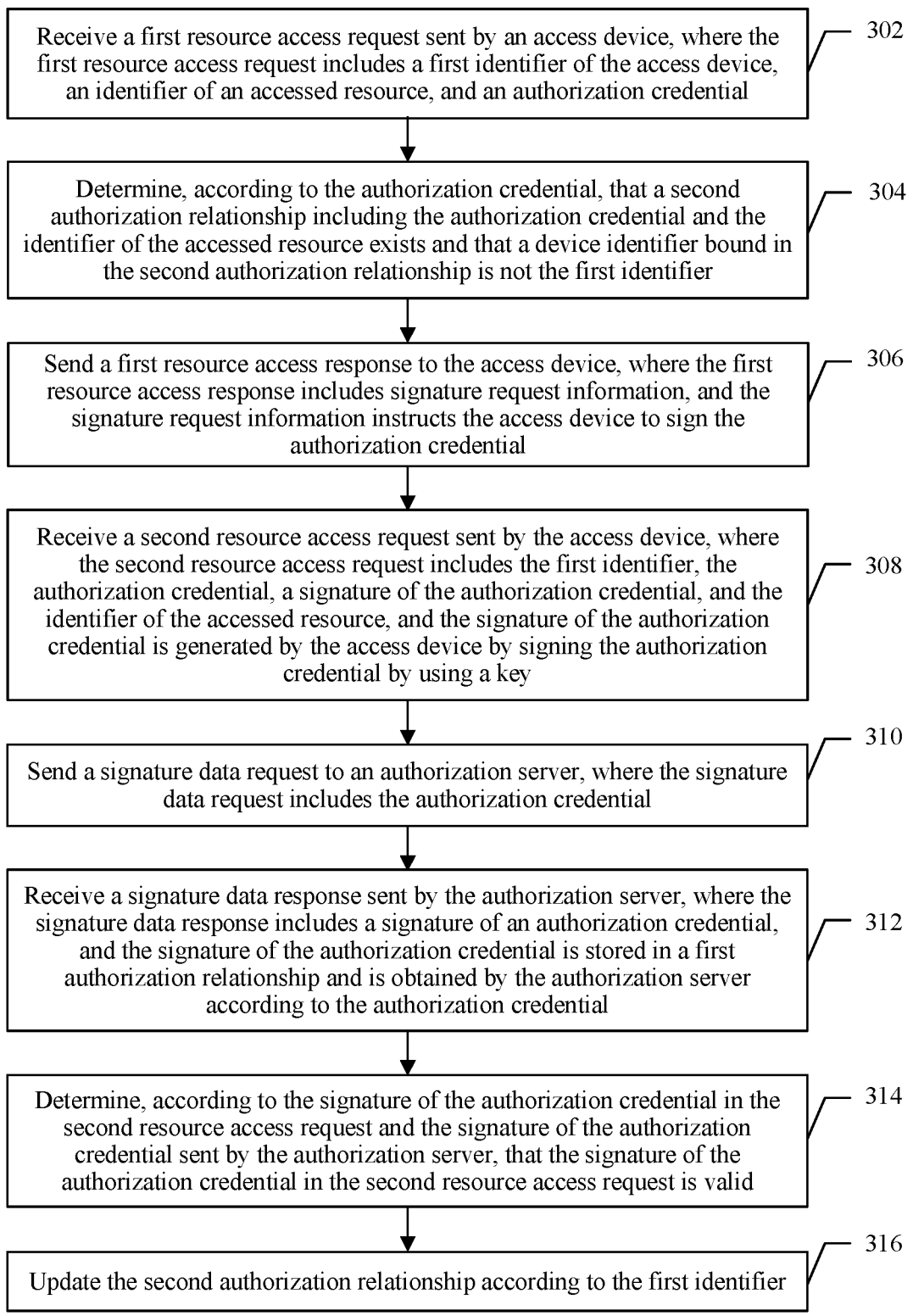
FIG. 3 is a flowchart of another authorization processing method according to an embodiment of the present invention.

FIG. 3 is a flowchart of another authorization processing method according to an embodiment of the present invention. The method includes the following steps.

Step 302: Receive a first resource access request sent by an access device, where the first resource access request includes a first identifier of the access device, an identifier of an accessed resource, and an authorization credential.

Step 304: Determine, according to the authorization credential, that a second authorization relationship including the authorization credential and the identifier of the accessed resource exists and that an access device identifier bound in the second authorization relationship is not the first identifier.

Step 306: Send a first resource access response to the access device, where the first resource access response includes signature request information, and the signature request information instructs the access device to sign the authorization credential.

Step 308: Receive a second resource access request sent by the access device, where the second resource access request includes the first identifier, the authorization credential, a signature of the authorization credential, and the identifier of the accessed resource, and the signature of the authorization credential is generated by the access device by signing the authorization credential by using a key.

Step 310: Send a signature data request to an authorization server, where the signature data request includes the authorization credential.

Step 312: Receive a signature data response sent by the authorization server, where the signature data response includes a signature of an authorization credential, and the signature of the authorization credential is stored in a first authorization relationship and is obtained by the authorization server according to the authorization credential.

Step 314: Determine, according to the signature of the authorization credential in the second resource access request and the signature of the authorization credential sent by the authorization server, that the signature of the authorization credential in the second resource access request is valid.

Specifically, a resource server compares the signature of the authorization credential sent by the authorization server with the signature of the authorization credential in the second resource access request, and determines, when the signature of the authorization credential sent by the authorization server is the same as the signature of the authorization credential in the second resource access request, that the signature of the authorization credential in the second resource access request is valid.

Step 316: Update the second authorization relationship according to the first identifier.

The updating the second authorization relationship according to the first identifier includes: changing a second identifier in the second authorization relationship to the first identifier, where the second identifier is an identifier that has been used by the access device; or deleting the second authorization relationship, and creating a new second authorization relationship, where the new second authorization relationship includes the first identifier, the authorization credential in the second authorization relationship, and the identifier of the accessed resource.

In an embodiment, before step 302, an initial authorization procedure further exists. The initial authorization procedure includes: receiving, by the authorization server, an authorization request sent by the access device, where the authorization request includes the second identifier, the identifier of the accessed resource, and authentication information that a user consents to resource access of the access device; determining, by the authorization server according to the authentication information, that the user has a right to access a resource corresponding to the identifier of the accessed resource, generating the authorization credential, and sending an authorization binding request to the resource server in which the resource corresponding to the identifier of the accessed resource is located, where the authorization binding request includes the second identifier, the authorization credential, and the identifier of the accessed resource; storing, by the resource server, a correspondence between the second identifier, the authorization credential, and the identifier of the accessed resource as the second authorization relationship, and sending an authorization binding response to the authorization server, where the authorization binding response includes information indicating that binding the second identifier, the authorization credential, and the identifier of the accessed resource is successful; sending, by the authorization server, an authorization response to the access device, where the authorization response includes the authorization credential, the identifier of the accessed resource, and information instructing to sign the authorization credential; receiving, by the authorization server, a signature binding request sent by the access device, where the signature binding request includes the second identifier, the authorization credential, the signature of the authorization credential, and the identifier of the accessed resource, and the signature of the authorization credential is generated by the access device by signing the authorization credential by using the key; and storing, by the authorization server, a correspondence between the second identifier, the authorization credential, the signature of the authorization credential, and the identifier of the accessed resource as the first authorization relationship.

In step 302, after the access device sends the first resource access request to the resource server, the resource server needs to make a decision on the first resource access request of the access device. Only when information in the first resource access request fully matches the second authorization relationship stored by the resource server, the resource server can permit the request and return a resource requested by the access device. If the resource server determines, according to the first resource access request, that the second authorization relationship including the authorization credential and the identifier of the accessed resource exists and that the access device identifier bound in the second authorization relationship is not the first identifier, the resource server determines that the access device identifier changes or the authorization credential is disclosed. Further, by performing step 306 to step 314, the resource server determines, according to the signature of the authorization credential obtained from the access device and the authorization server, that both the first identifier and the second identifier are identifiers of the access device, and further proactively uses the first identifier to update the stored second authorization relationship.

Further, after the updating the second authorization relationship according to the first identifier, the method further includes: sending a second resource access response to the access device, where the second resource access response includes the resource corresponding to the identifier of the accessed resource. In this way, the access device uses an original authorization relationship to achieve resource access.

Optionally, after the determining that the signature of the authorization credential in the second resource access request is valid, the method further includes: sending a third authorization update request to the authorization server, where the third authorization update request includes the authorization credential and the first identifier; and receiving a third authorization update response sent by the authorization server, where the third authorization update response includes information indicating that the authorization server successfully performs authorization update.

This embodiment of the present invention provides the authorization processing method in Machine-to-Machine communication. When the identifier of the access device in an M2M system changes for a reason, the M2M system can identify an identity of the access device by determining whether a signature of verification information is valid. The M2M can determine whether a signature of the verification information is valid by comparing whether a signature of verification information sent by the access device is the same as a signature of verification information in the first authorization relationship stored by the authorization server. The M2M system can further update an existing authorization relationship, so that the access device can continue to use the existing authorization relationship. Therefore, seamless resource access is implemented, and service continuity of the M2M system is ensured.

Specific implementation processes of the authorization processing methods in FIG. 2 and FIG. 3 are separately described below based on an ACP authorization architecture and an OAuth authorization architecture.

When an ACP authorization architecture is used in an M2M system to authorize resource access of an access device, the verification information may be a second identifier of the access device. In embodiments shown in FIG. 4 and FIG. 5, an authorization procedure performed based on the ACP authorization architecture in the M2M system is provided, including two sub-procedures: initial authorization and authorization update. The initial authorization is a procedure in which an authorization server obtains a signature of verification information for the access device and generates an authorization relationship before the identifier of the access device changes.

Figure 4:
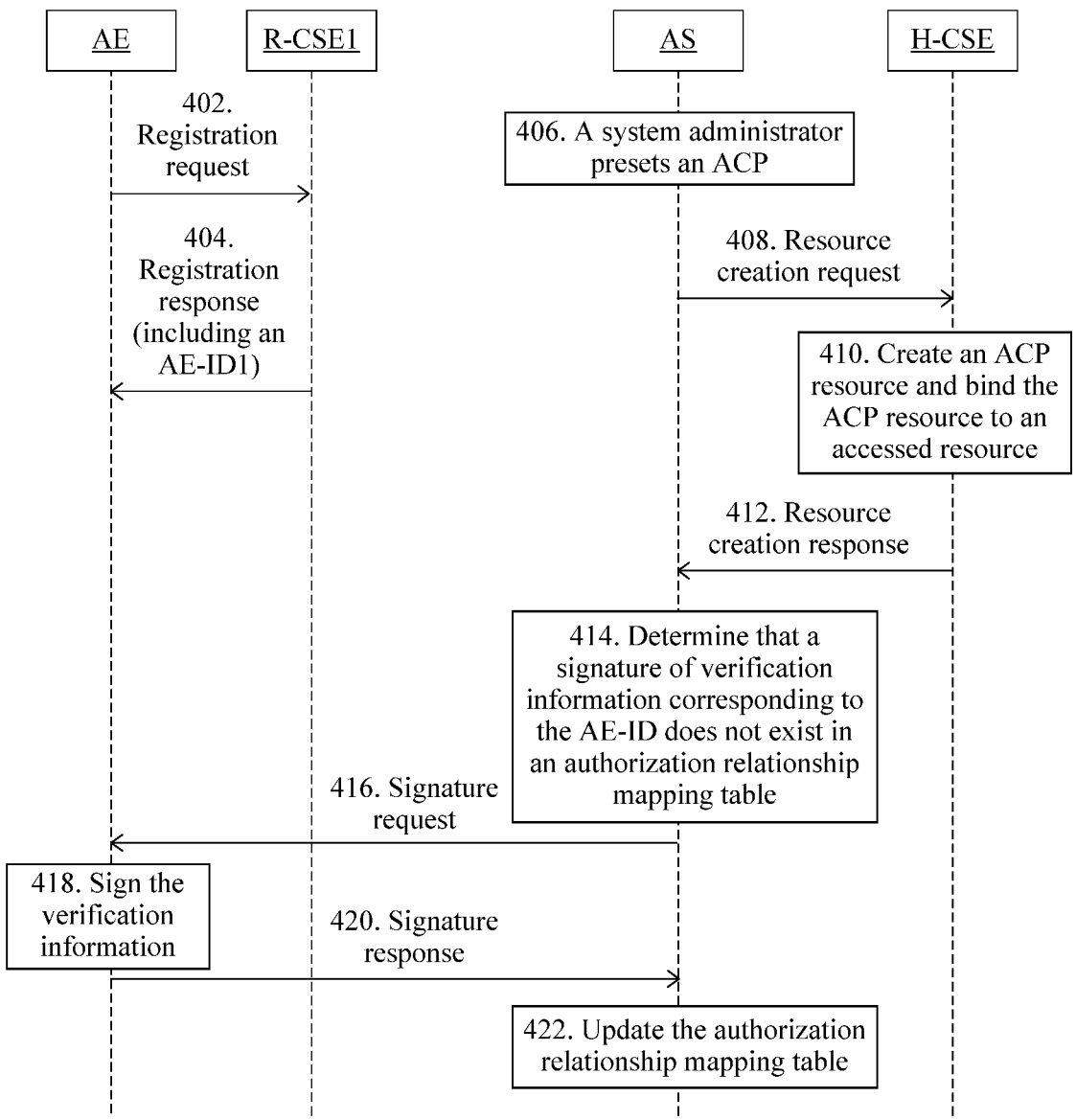
FIG. 4 is a flowchart of initial authorization performed based on an ACP authorization architecture according to an embodiment of the present invention.

Referring to FIG. 4, FIG. 4 is a flowchart of initial authorization performed based on an ACP authorization architecture according to an embodiment of the present invention. An access device in this embodiment is an application entity (AE). However, a specific form of the access device is not limited in this embodiment of the present invention. The initial authorization procedure includes the following steps.

Step 402 and Step 404: The AE sends a registration request to a registrar 1 (R-CSE1), and the registrar 1 allocates an identifier AE-ID1 to the AE.

Step 406: A system administrator (Admin) creates an ACP for the AE on an authorization server (AS).

In an embodiment, based on the ACP authorization architecture, the Admin usually manually sets the ACP for the AE. In an M2M system, an ACP is created as a resource and bound to a corresponding resource. A binding manner is to add a resource identifier (ACP ID) of the ACP to an access control policy identifier accessControlPolicyIDs attribute value of the corresponding resource. As described in the background, each rule of an ACP resource in the M2M system is a 3-tuple <accessControlOriginators, accessControlContexts, accessControlOperations>. In this embodiment of the present invention, that the Admin creates the ACP for the AE may be specifically: setting an accessControlOriginators parameter to "/CSE0005/CAE0001", where/CSE0005/CAE0001 is the AE-ID1. Another parameter is unrelated to the solutions of the present invention, and therefore is not limited in this embodiment of the present invention.

Step 408: The authorization server sends an ACP resource creation request to a resource server (H-CSE).

The ACP resource creation request includes all attribute data of the ACP created by the Admin for the AE and a corresponding bound resource identifier. For example, the ACP resource creation request sent by the authorization server to the resource server may be:

POST http://m2 m.things.com/CSE0003 HTTP/1.1
From: http://authzserver.things.com
Content-type: application/onem2m-resource+json
{"ResourceType":"accessControlPolicy",
"privileges.accessControlOriginators": "/CSE0005/CAE0001",
"res_uri":"/CSE0003/resource1" }

"http://m2 m.things.com/CSE0003" is a URL (Uniform Resource Locator) of the H-CSE and is a parent node on which the AS expects to create the ACP resource. That is, the ACP resource is created on a root node of the H-CSE. During specific implementation, the AS may define, in a URL of a POST request, a parent resource ID of the ACP resource that needs to be created. Which resource the ACP resource is created on does not affect the solutions of the present invention, and therefore is not limited in the present invention. "From" describes an ID of an originator of the resource creation request, that is, an URL address "http://authzserver.things.com" of the authorization server in this embodiment. An HTTP message body includes all attributes of the created ACP resource. ""ResourceType":"accessControlPolicy"" indicates that a type of the resource currently requested to be created is ACP. ""privileges.accessControlOriginators":"/CSE0005/CAE0001"" indicates that an access device to which the created ACP resource is applicable is "/CSE0005/CAE0001". The HTTP message body should further include another attribute of the created ACP resource. However, this is unrelated to the solutions of the present invention, and therefore is not described in this embodiment. In addition, ""res_uri":"/CSE0003/resource1"" indicates that a resource URI to which the ACP resource needs to be bound is "/CSE0003/resource1". During specific implementation, the resource URI that needs to be bound may be described in another manner (for example, the resource URI is included in the URL of the POST request and described as a query string form). However, a specific description manner of the resource URI does not affect a creation and binding process of the ACP resource.

Step 410: The resource server creates an ACP resource and binds the created ACP resource to a corresponding resource.

In an embodiment, after receiving the ACP resource creation request of the AS, the H-CSE first parses the resource creation request to obtain a creation location or the parent resource ID of the ACP resource, and then parses the HTTP message body to obtain each attribute value of the created ACP resource. For example, in this embodiment of the present invention, the creation location of the ACP resource is "http://m2 m.things.com/CSE0003". That is, the resource is created on the root node of the H-CSE. In addition, in the HTTP message body, ""ResourceType": "accessControlPolicy"" indicates that the type of the created resource is ACP, and ""accessControlOriginators":"/CSE0005/CAE0001"" indicates that an accessControlOriginators parameter value of an access control rule in the ACP is "/CSE0005/CAE0001". During specific implementation, the HTTP message body in the ACP resource creation request may further include another attribute value of the ACP resource. When creating the ACP resource, the H-CSE also needs to obtain a corresponding attribute value of the created ACP resource and assign a value.

In an embodiment, after the H-CSE completes creation of the ACP resource, the H-CSE allocates an ACP ID to the ACP resource and sets the ACP ID as a resource identifier (that is, a resourceID attribute) of the ACP resource, for example, "ACP0001". The ACP ID uniquely identifies the ACP resource within the H-CSE. Then, the H-CSE finds the corresponding resource, that is, "/CSE0003/resource1", according to the bound resource identifier in the ACP resource creation request, and adds the ACP ID of the created ACP resource, that is, "ACP0001", to an accessControlPolicyIDs attribute value list of the resource.

Step 412: The resource server returns an ACP resource creation response to the authorization server.

In an embodiment, the H-CSE returns the ACP resource creation response to the AS. The response includes an HTTP 200 response code. For example, the ACP resource creation response returned by the H-CSE to the AS is:

HTTP/1.1 200 OK
Content-type: application/onem2m-resource+json
{"resourceID": "/CSE0003/ACP0001" }

A status code of an HTTP response is "200", indicating that the H-CSE has already completed creation and binding of the corresponding ACP resource. In an HTTP message body, ""resourceID": "/CSE0003/ACP0001"" indicates that the ACP ID allocated by the H-CSE to the created ACP is "/CSE0003/ACP0001". A CSE ID of the H-CSE is added before the ACP ID, so as to uniquely identify the ACP resource in the M2M system.

Step 414: The authorization server determines whether a signature of verification information corresponding to the AE-ID1 exists in a stored authorization relationship mapping table.

In an embodiment, the AS queries the stored authorization relationship mapping table for an authorization relationship in which an access device identifier is equal to the AE-ID1. If a corresponding authorization relationship can be found and a signature of corresponding verification information is stored in the authorization relationship, the initial authorization is completed; or if a corresponding authorization relationship cannot be found, step 416 is performed, that is, initiating a signature request to the AE, to request the AE to sign corresponding verification information.

In an embodiment, each authorization relationship in the authorization relationship mapping table is used to store an access device identifier, an identifier of an accessed resource, verification information of an access device, and a signature of the verification information. For example, a possible structure of the authorization relationship mapping table is recorded in Table 1.

TABLE 1

Authorization relationship mapping table

| subjectID | signature | res_uris |
|---|---|---|
| /CSE0003/CAE0002 | 94R3JDFSF0 | /CSE0002/resource3, /CSE0004/resource2 |
| /CSE0005/CAE0004 | FSAF9432J3 | /CSE0002/resource5 |

As shown in Table 1, each row in this table indicates an authorization relationship corresponding to an access device, including an access device identifier (subjectID), a signature (signature), and an accessed resource URI list (res_uris). It should be noted that, in the authorization relationship mapping table, an access device identifier is also used as verification information of an access device. A value of the "signature" column is a signature generated by an access device by singing a corresponding access device identifier by using a key. It can be learned from the first row of Table 1 that the res_uris column has two accessed resource URIs. Actually, an authorization status of one access device is recorded and stored in each authorization relationship in the authorization relationship mapping table. Apparently, a same access device may obtain access rights for multiple resources.

During specific implementation, verification information in another form may be used for each access device. For example, a randomly generated string is used as the verification information, and a signature value of each access device to the verification information is stored, as shown in Table 2:

TABLE 2

Authorization relationship mapping table (another example)

| subjectID | challenge | signature | res_uris |
|---|---|---|---|
| /CSE0003/CAE0002 | 8A43RJNKFE984TJK35 | 94R3JDFSF0 | /CSE0002/resource3, /CSE0004/resource2 |
| /CSE0005/CAE0004 | MNXCVDFS4I3SDAF832 | FSAF9432J3 | /CSE0002/resource5 |

Figure 13:
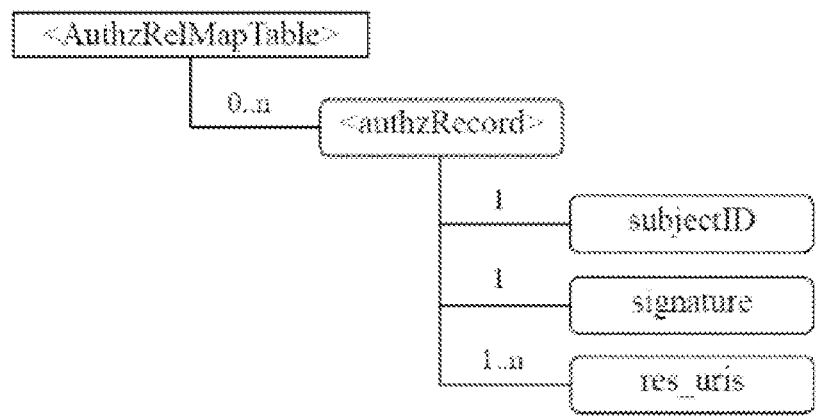
FIG. 13 depicts a Table 3.

Table 2 shows an authorization relationship mapping table structure in which each access device stores randomly generated verification information (challenge) and a signature of the verification information. During specific implementation, which information is used as the verification information does not affect the specific solutions of the present invention. In this embodiment, it is assumed that the authorization relationship mapping table structure shown in Table 1 is used in the M2M system, that is, the access device identifier is used as the verification information. During specific implementation, the authorization relationship mapping table may be maintained by using a common database inside the AS, or described as a RESTful resource AuthzRelMapTable. Based on the ACP authorization architecture, the AuthzRelMapTable resource may be indicated in a form shown in Table 3 (FIG. 13).

AuthzRelMapTable is an authorization relationship mapping table resource. The resource includes several authorization record attributes, that is, an authzRecord resource. Each authzRecord resource records an authorization relationship of one access device, and the authzRecord resource includes the following attributes:

subjectID: corresponds to an access device identifier attribute in Table 1;

signature: corresponds to a signature attribute in Table 1; and res_uris: corresponds to an accessed resource URI list attribute in Table 1.

Table 1 is used as an example. In an embodiment, after receiving the resource creation response of the H-CSE, the AS first searches the authorization relationship mapping table for an authorization relationship in which an access device identifier is equal to the AE-ID1. That is, the AS searches for an authorization relationship in which a value of the "subjectID" column is equal to "/CSE0005/CAE0001". If an authorization relationship that satisfies the condition can be found in the authorization relationship mapping table, and a signature attribute value of the authorization relationship is not null, the AS directly terminates the initial authorization procedure; or if an authorization relationship that satisfies the condition cannot be found in the authorization relationship mapping table, the AS initiates a signature request procedure and performs step 416.

Step 416: The authorization server sends a signature request to the AE.

Specifically, the signature request initiated by the AS to the AE may be:

POST http://m2 m.things.com/CSE0005/CAE0001 HTTP/1.1

Content-type: application/onem2m-resource+json

{"SigReq": "1" }

A URL in a POST request is a URI of the AE on an R-CSE. After receiving the request, the R-CSE forwards the signature request to the AE. In an HTTP message body, ""SigReq": "1"" is a signature request flag bit, indicating that the AE needs to sign the verification information. The verification information in this embodiment is the AE-ID1. Because the AE stores an identifier of the AE itself, the HTTP message body in the foregoing signature request does not need to include a verification information parameter. During specific implementation, when verification information in another form is used, the HTTP message body in the foregoing signature request may include a corresponding verification information parameter.

Step 418: The AE uses a device factory key to sign the verification information.

In an embodiment, after receiving the signature request of the AS, the AE first detects whether the HTTP message body includes the signature request flag bit "SigReq". When a resource access response includes a "SigReq" parameter and a value of the "SigReq" parameter is "1", the AE uses a preset signature algorithm and the device factory key to sign the corresponding verification information. In this embodiment, a signature obtained by calculating the AE-ID1 is "JYUI7BZO92".

Specifically, the AE binds and locally stores the current AE-ID1 and an M2M SP ID (M2M Service Provider Identifier). A storage method may be implemented by using an access device identifier mapping table, or another storage manner is used. During specific implementation, which storage method is used does not affect the solutions of the present invention. In this embodiment, it is assumed that the AE end uses an access device identifier mapping table to store a correspondence between an AE-ID and an M2M SP ID, as shown in Table 4:

TABLE 4

| Access device identifier mapping table | |
| --- | --- |
| Access device identifier | M2M SP ID |
| /CSE0005/CAE0001 | http://m2m.things.com |
| SAE2002 | http://m2m.example.com |

In the M2M system, the AE stores a currently allocated identifier. It should be noted that the currently allocated identifier stored by the AE is not related to the access device identifier mapping table stored herein. For example, if the access device re-registers with a new registrar for a reason and obtains an identifier AE-ID11, the access device stores the AE-ID11 as a current device identifier. However, if the access device does not use the AE-ID11 to re-apply for authorization, the access device identifier in the access device identifier mapping table is not updated.

Step 420: The AE returns a signature response to the AS.

Specifically, the AE returns the signature response to the AS. For example, the signature response returned by the AE to the AS is:

HTTP/1.1 200 OK
Content-type: application/onem2m-resource+json
{"signature": "JYUI7BZO92" }

A status code of an HTTP response is "200", indicating that the AE has already signed the verification information. In an HTTP message body, ""signature": "JYUI7BZO92"" indicates that a signature of the verification information is "JYUI7BZO92".

Step 422: After receiving the signature response of the AE, the authorization server parses the signature response to obtain the signature of the verification information, and adds a corresponding authorization relationship to the authorization relationship mapping table.

In an embodiment, when the AS receives the signature response of the AE, the AS first parses the HTTP message body in the signature response to obtain the signature of the verification information, that is, "JYUI7BZO92". Then, the AS searches the authorization relationship mapping table for an authorization relationship corresponding to the AE. That is, the AS searches for an authorization relationship in which a subjectID attribute value is equal to the AE-ID1, that is, "/CSE0005/CAE0001". If the authorization relationship is found, a value "JYUI7BZO92" is assigned to a signature attribute value of the authorization relationship. If the authorization relationship is not found, a new authorization relationship is constructed, and the authorization relationship is added to the authorization relationship mapping table. In this embodiment of the present invention, as shown in Table 1, the authorization relationship corresponding to the AE does not exist in the authorization relationship mapping table of the AS. Therefore, the AS generates a new authorization relationship and updates the new authorization relationship into the authorization relationship mapping table. An updated authorization relationship mapping table is shown in Table 5. Data in the third row in this table is the newly generated authorization relationship.

TABLE 5

| Authorization relationship mapping table | | |
| --- | --- | --- |
| subjectID | signature | res_uris |
| /CSE0003/CAE0002 | 94R3JDFSF0 | /CSE0002/resource3, CSE0004/resource2 |
| /CSE0005/CAE0004 | FSAF9432J3 | /CSE0002/resource5 |
| /CSE0005/CAE0001 | JYUI7BZO92 | /CSE0003/resource1 |

Figure 5:
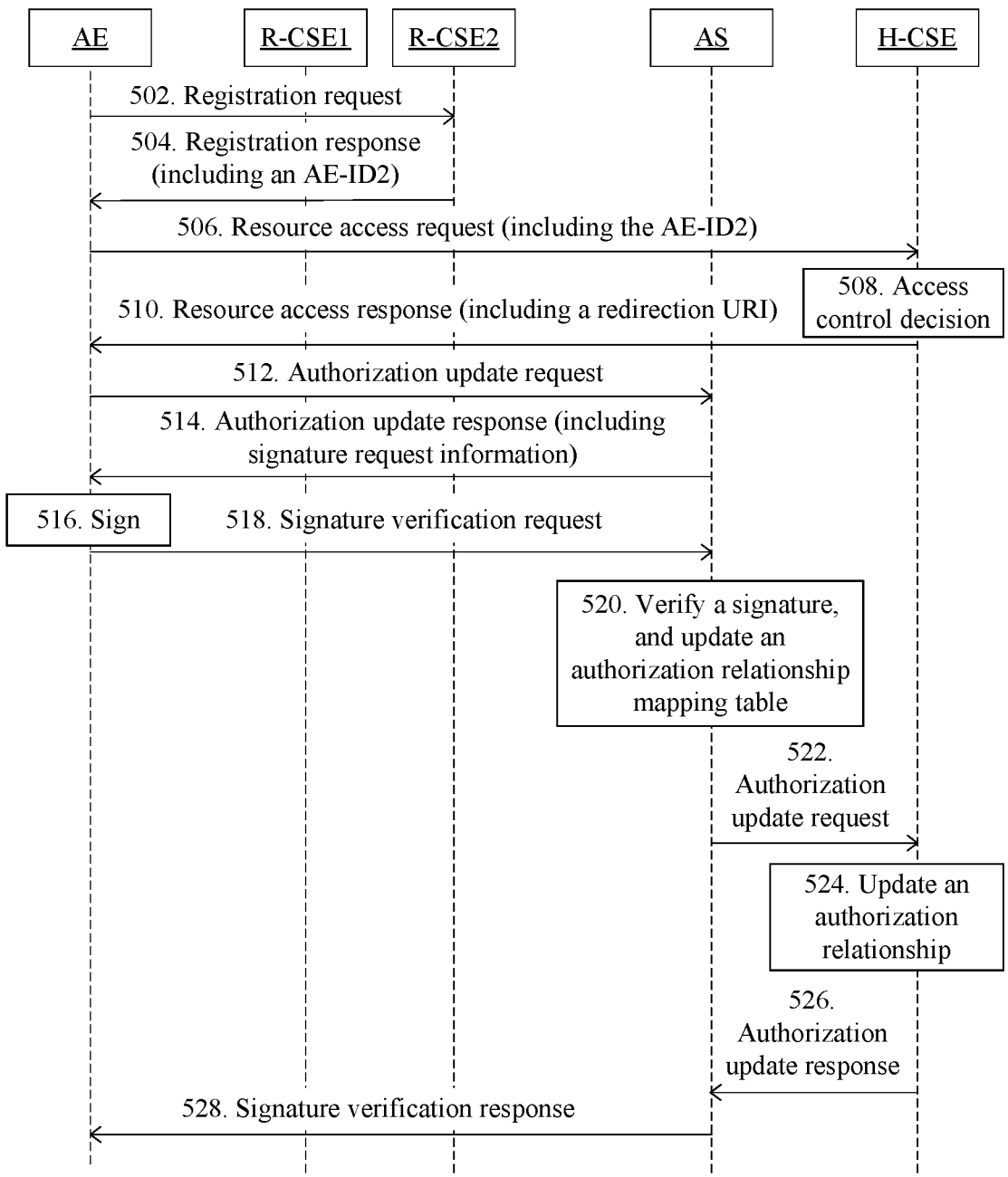
FIG. 5 is a flowchart of authorization update performed based on an ACP authorization architecture according to an embodiment of the present invention.

Referring to FIG. 5, FIG. 5 is a flowchart of authorization update performed based on an ACP authorization architecture according to an embodiment of the present invention. When an AE in the embodiment in FIG. 4 registers with a different registrar (for example, an R-CSE2) for a reason such as an access location change, the new registrar R-CSE2 may allocate a new identifier AE-ID2 to the AE. Consequently, an existing authorization relationship in an M2M system becomes ineffective. The method in FIG. 5 is a method for updating an authorization relationship after an access identifier changes. The method includes the following steps.

Step 502 and Step 504: The AE sends a registration request to the registrar 2 (R-CSE2), and the registrar 2 allocates the identifier AE-ID2 to the AE.

Step 506: The AE initiates a resource access request to a resource server (H-CSE), where the resource access request includes the AE-ID2 and a URI of an accessed resource.

Specifically, the AE sends the resource access request to the H-CSE. For example, an initial resource access request initiated by the AE to the H-CSE is:

GET http://m2 m.things.com/CSE0003/resource1?from=/CSE0005/CAE0003 HTTP/1.1

"http://m2 m.things.com/CSE0003/resource1" is the URI of the accessed resource, and "from=/CSE0006/CAE0003" indicates an access device identifier, that is, the AE-ID2 of the AE.

Step 508: The resource server (H-CSE) makes an access control decision according to information carried in the access request.

In an embodiment, after the H-CSE receives the resource access request of the AE, the H-CSE first parses out the URI of the accessed resource in the resource access request, that is, a URL address "/CSE0003/resource1" in a GET request, and locally searches for a corresponding resource resource1. Then, the H-CSE parses the resource access request to obtain the AE-ID2, that is, a URL query string "/CSE0006/CAE0003" in the GET request. Finally, the H-CSE finds, in an accessControlPolicyIDs attribute value of the corresponding resource resource1, an ACP ID list bound to the resource, and determines, according to an access control decision process described in the background, whether the AE has a right to access the resource. In comparison with an initial authorization, it is assumed that only the access device identifier of the AE changes from an AE-ID1 to the AE-ID2, and other attributes (for example, an operation and a context environment) related to the resource access in this embodiment are consistent with constraints during initial authorization. In an ACP preset by an Admin for the AE during the initial authorization, a privileges.accessControlOriginators attribute value includes only the AE-ID1, that is, /CSE0005/

CAE0001. Therefore, in an access decision process, the H-CSE cannot find the AE-ID2, that is/CSE0006/CAE0003, in the value of the privileges.accessControlOriginators attribute, wherein the privileges.accessControlOriginators is the attribute of the ACP preset by the Admin for the AE. In this case, a result of the access control decision is that the current resource access is not permitted. In a current solution, a resource server directly rejects an access request of an access device. Consequently, resource access fails when an access device identifier of a same access device changes.

Step 510: The resource server returns a resource access response to the AE, where the response includes an HTTP 302 response code and a redirection URL, and the redirection URL points to an authorization update port of an authorization server.

Specifically, when the access control decision of the H-CSE is that the current resource access is not permitted, the resource access response returned by the H-CSE to the AE is:

HTTP/1.1 302 Move temporarily
Location: http://authzserver.things.com/authzupdate # from=/CSE0006/CAE0003& res_uri=/CSE0003/resource1

A status code of an HTTP response is "302", indicating that the resource access request of the AE needs to be redirected to a new URL. "Location:http://authzserver.things.com/authzupdate" indicates the redirection URL. The redirection URL points to the authorization update port of the authorization server in the M2M system. For example, http://authzserver.things.com/authzupdate is an authorization update port address of the authorization server. "# from=/CSE0006/CAE0003&res_uri=/CSE0003/resource1" is parameter information that needs to be attached in a redirected resource access request, includes the AE-ID2 (that is, /CSE0006/CAE0003) and the URI of the accessed resource (that is, /CSE0003/resource1), and is indicated in a query string form.

Step 512: After receiving the resource access response of the resource server, the AE sends an authorization update request to the authorization server, where the authorization update request includes the AE-ID2 and the URI of the accessed resource.

Specifically, the AE receives the resource access response of the H-CSE and detects the HTTP status code. When the status code is "302", the AE sends the authorization update request to the AS. For example, the authorization update request sent by the AE to the AS may be:

GET/authzupdate?from=/CSE0006/CAE0003&res_uri=CSE0003/resource1 HTTP/1.1
Host: http://authzserver.things.com A URL address "/authzupdate?from=/CSE0006/CAE0003&res_uri=CSE0003/resource1 HTTP/1.1" in a GET request indicates an authorization update port address of the authorization server and attached parameter information. The attached parameter information includes the AE-ID2 (that is, /CSE0006/CAE0003) and an identifier of the accessed resource (that is, /CSE0003/resource1). "Host" describes an address of the authorization server.

Step 514: After receiving the authorization update request of the AE, the authorization server returns an authorization update response to the AE, where the response includes an HTTP 202 response code and a signature request flag bit.

In an embodiment, after the AS receives the authorization update request of the AE, the authorization update response returned by the AS to the AE is:

HTTP/1.1 202 Accepted
Content-type: application/onem2m-resource+j son
{"SigReq": "2" }

A status code of an HTP response is "202", indicating that the AS has already accepted the authorization update request of the AE. However, more information is required for subsequent processing. In an HTTP message body, ""SigReq": "2"" is a signature request flag bit, indicating that the AE needs to sign verification information and the current access device identifier. In this embodiment, the verification information is an access device identifier AE-ID1 of the AE during the initial authorization, that is, /CSE0005/CAE0001, and the current access device identifier is the AE-ID2: /CSE0006/CAE0003.

Step 516: The AE uses a device factory key to sign verification information and sign the current access device identifier AE-ID2.

In an embodiment, after the AE receives the authorization update response of the H-CSE, when detecting that the status code of the HTTP response is "202" and that the HTTP message body includes a "SigReq" parameter with a value "2", the AE signs the locally stored AE-ID1. In this embodiment, the AE-ID1 is locally stored in a form of an access device identifier mapping table, as shown in Table 4. The AE finds the corresponding access device identifier AE-ID1: /CSE0005/CAE0001, in the access device identifier mapping table according to an identifier (that is, an M2M SP ID, which is "http://m2 m.things.com" in this embodiment) of the M2M system currently accessed by the AE. In this embodiment, the AE-ID1 /CSE0005/CAE0001 is the corresponding verification information.

In an embodiment, after the AE finds the locally stored AE-ID1, the AE signs the AE-ID1 and the AE-ID2. In this embodiment, "JYUI7BZO92" is obtained by signing the AE-ID1, and "M6UI7B2OKQ" is obtained by signing the AE-ID2. Then, the AE-ID2 is updated into the locally stored access device identifier mapping table, to replace the original AE-ID1. That is, "/CSE0005/CAE0001" is replaced with "/CSE0006/CAE0003" in Table 4, to obtain an updated access device identifier mapping table shown in Table 6.

TABLE 6

Access device identifier mapping table

| Access device identifier | M2M SP ID |
|---|---|
| /CSE0006/CAE0003 | http://m2m.things.com |
| SNE2002 | http://m2m.example.com |

Step 518: The AE sends a signature verification request to the authorization server.

After the AE completes the signing, the AE initiates the signature verification request to the AS. The request includes the AE-ID1, a signature of the AE-ID1, the AE-ID2, and a signature of the AE-ID2.

Specifically, the signature verification request initiated by the AE to the AS is:

PUT http://authzserver.things.com/authzupdate HTTP/1.1
Content-type: application/onem2m-resource+json
{"aeid_ori": "/CSE0005/CAE0001", "sig_ori": "JYUI7BZO92"
"aeid_now": "/CSE0006/CAE0003", "sig_now": "M6UI7B2OKQ" }

A status code of an HTTP response is "200", indicating that the AE has already signed the verification information. In an HTTP message body, ""aeid_ori": "/CSE0005/CAE0001"" indicates that the access device identifier AE-ID1 during the initial authorization is "/CSE0005/CAE0001"; ""sig_ori": "JYUI7BZO92"" indicates that the signature of the access device identifier AE-ID1 during the initial authorization is "JYUI7BZO92"; ""aeid_now": "/CSE0006/CAE0003"" indicates that the current access device identifier AE-ID2 of the AE is "/CSE0006/CAE0003"; and ""sig_now": "M6UI7B2OKQ"" indicates that the signature of the current access device identifier AE-ID2 of the AE is "M6UI7B2OKQ".

Step 520: The AS verifies a signature in the signature verification request, to determine whether to update an authorization relationship mapping table.

After the AS receives the signature verification request of the AE, the AS searches the authorization relationship mapping table for an authorization relationship in which an access device identifier is the AE-ID1, compares whether the signature of the AE-ID1 in the signature verification request is consistent with a signature in the authorization relationship, and further performs authorization update for the AE or rejects the authorization update request.

In an embodiment, after the AS receives the signature verification request of the AE, the AS first parses the signature verification request to obtain the AE-ID1, the signature of the AE-ID1, the AE-ID2, and the signature of the AE-ID2. Then, the AS searches the authorization relationship mapping table for an authorization relationship in which a subjectID attribute value is the AE-ID1 (that is, "/CSE0005/CAE0001"), and verifies whether a signature attribute value in the authorization relationship is the same as the signature of the AE-ID1 (that is, "JYUI7BZO92"). If the signature attribute value in the corresponding authorization relationship is different from the signature of the AE-ID1, the authorization server rejects the signature verification request of the AE and returns a signature verification response (for example, HTTP/1.1 403 Forbidden) and an authorization update procedure terminates. If the signature attribute value in the corresponding authorization relationship is the same as the signature of the AE-ID1, the current authorization update of the AE is permitted, the subjectID attribute value in the authorization relationship is updated to the AE-ID2 (that is, "/CSE0006/CAE0003"), and the signature attribute value is updated to the signature of the AE-ID2 (that is, "M6UI7B2OKQ"). In this embodiment of the present invention, apparently, signature verification is successful. The AS updates the authorization relationship mapping table, as shown in Table 7.

TABLE 7

Authorization relationship mapping table

| subjectID | signature | res_uris |
|---|---|---|
| /CSE0003/CAE0002 | 94R3JDFSF0 | /CSE0002/resource3, /CSE0004/resource2 |
| /CSE0005/CAE0004 | FSAF9432J3 | /CSE0002/resource5 |
| /CSE0006/CAE0003 | M6UI7B2OKQ | /CSE0003/resource1 |

Step 522: The authorization server sends an authorization update request to the resource server.

After the AS permits the authorization update of the AE, the AS initiates the authorization update request to the H-CSE. The request includes the URI of the accessed resource, the AE-ID1, and the AE-ID2.

In an embodiment, the authorization update request may be:

PUT http://m2 m.things.com/CSE0003/resource1 HTTP/1.1
From: http://authzserver.things.com
Content-type: application/onem2m-resource+json {"aeid_ori": "/CSE0005/CAE0001",
"aeid_now": "/CSE0006/CAE0001" }

"/CSE0003/resource1" is the URI of the accessed resource. In an HTTP message body, ""aeid_ori": "/CSE0005/CAE0001"" indicates that the original access device identifier AE-ID1 is "/CSE0005/CAE0001", and ""aeid_now": "/CSE0006/CAE0001"" indicates that the current access device identifier AE-ID2 is "/CSE0006/CAE0003".

Step 524: The resource server updates an authorization relationship.

After the H-CSE receives the authorization update request of the AS, the H-CSE finds a corresponding resource according to the URI of the accessed resource and updates an authorization relationship associated with the resource.

In an embodiment, after receiving the authorization update request of the AS, the H-CSE first parses the authorization update request to obtain the URI of the accessed resource, that is, "/CSE0003/resource1", locally finds a corresponding resource, then parses an HTTP message body in the authorization update request to obtain the AE-ID1 (that is, "/CSE0005/CAE0001") and the AE-ID2 (that is, "/CSE0006/CAE0003"), finds, in an accessControlPolicyIDs attribute of the corresponding resource resource1, a list of all ACP IDs associated with the resource, searches these ACPs for an ACP resource whose privileges.accessControlOriginators attribute value includes "/CSE0005/CAE0001", and updates the privileges.accessControlOriginators attribute value of the ACP resource to "/CSE0006/CAE0003".

Step 526: The resource server sends an authorization update response to the authorization server.

After the H-CSE completes the authorization update, the H-CSE returns an authorization update response to the AS. Specifically, after the H-CSE completes the authorization update, the authorization update response returned by the H-CSE to the AS is:

HTTP/1.1 200 OK

A status code of an HTTP response is "200", indicating that the H-CSE has already completed updating of the corresponding ACP resource.

Step 528: The authorization server sends a signature verification response to the AE.

After the AS receives the authorization update response of the H-CSE, the AS returns the signature verification response to the AE.

In an embodiment, after the AS receives the authorization update response of the H-CSE, the signature verification response returned by the AS to the AE is:

HTTP/1.1 200 OK

A status code of an HTTP response is "200", indicating that the AS has already completed the authorization update requested by the AE.

After the AE receives the signature verification response sent by the authorization server, it indicates that updating of the authorization relationship has already been completed in the M2M system. In this case, the AE may use the access device identifier AE-ID2 to access the accessed resource/CSE0003/resource1.

In this embodiment, when an M2M device, such as the AE, in the M2M system accesses an accessed resource after an identifier changes, the resource server triggers an authorization relationship update procedure. The M2M system determines an identity of an access device by verifying a signature of verification information of the access device, and updates an existing authorization relationship. Therefore, the M2M device can implement seamless resource access, and service continuity of the M2M system is ensured.

When an OAuth authorization architecture is used in an M2M system to authorize resource access of an access device, the verification information may be an access token generated by an authorization server. In embodiments shown in FIG. 6A and FIG. 6B, and FIG. 7, an authorization procedure performed based on the OAuth authorization architecture is provided in the M2M system, including two procedures: initial authorization and authorization update. The initial authorization is a procedure in which the authorization server obtains identity verification information for the access device and generates an authorization relationship before the identifier of the access device changes.

Figure 6A:
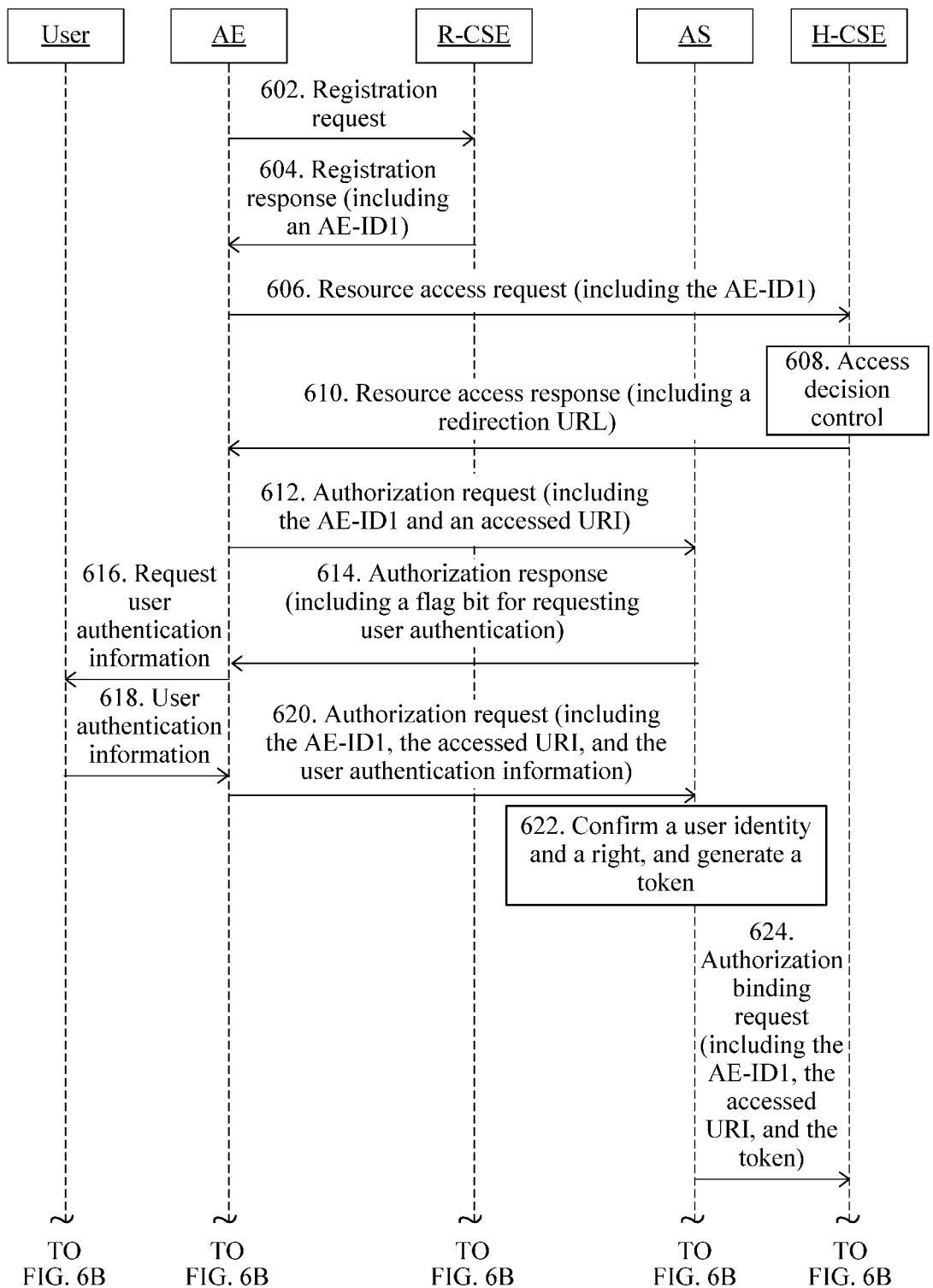
FIG. 6A and FIG. 6B are a flowchart of initial authorization performed based on an OAuth authorization architecture according to an embodiment of the present invention.
Figure 6B:
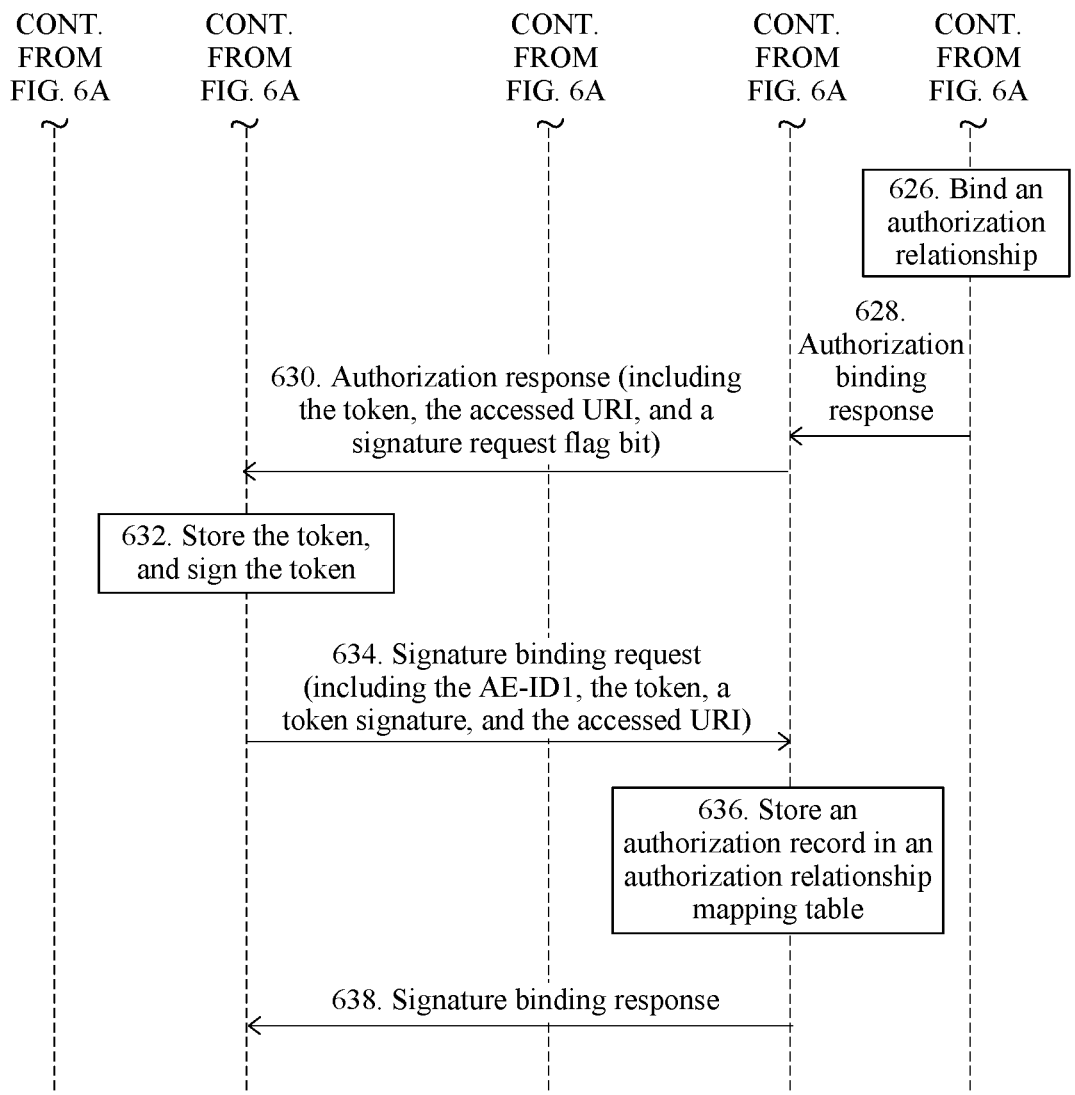

Referring to FIG. 6A and FIG. 6B, FIG. 6A and FIG. 6B are a flowchart of initial authorization performed based on an OAuth authorization architecture according to the present invention. An access device in this embodiment is an application entity AE. However, a specific form of the access device is not limited in this embodiment of the present invention. The initial authorization procedure includes the following steps.

Step 602 and Step 604: The AE sends a registration request to a registrar 1 (R-CSE1), and the registrar 1 allocates an identity identifier AE-ID1 to the AE.

Step 606: The AE initiates an initial resource access request to a resource server (H-CSE), where the resource access request includes the AE-ID1 and a URI of an accessed resource.

Specifically, the AE sends the initial resource access request to the H-CSE. For example, the resource access request initiated by the AE to the H-CSE is: GET http://m2m.things.com/CSE0003/resource1?from=/CSE0005/CAE0001 HTP/1.1

"CSE0003/resource1" is the URI of the accessed resource, and "from=/CSE0005/CAE0001" indicates an access device identifier, that is, the AE-ID1 of the AE. The AE initially accesses the accessed resource, and the AE locally stores no access token that is bound to the resource. Therefore, the initial resource access request includes no access token parameter.

Step 608: The resource server (H-CSE) receives the resource access request sent by the AE, and makes an access control decision.

In an embodiment, when receiving the resource access request, the H-CSE first locally searches for a corresponding resource according to the URI of the accessed resource in the resource access request. If the resource cannot be locally found, the H-CSE returns a resource access rejection response to the AE, for example, HTTP/1.1 404 Not Found. If the accessed resource can be locally found, the H-CSE searches a resource attribute for a corresponding authorization relationship according to an access device identifier and an access token in the resource access request. When the resource access request sent by the AE is the initial resource access request, and as described in step 606, the request includes no access token parameter, the H-CSE determines that the AE initially accesses the resource, and the H-CSE initiates an authorization procedure.

Step 610: The resource server returns a resource access response to the AE.

The response includes a redirection response code and a redirection URL. The redirection URL points to a dynamic authorization address of an authorization server in the M2M system.

In an embodiment, the H-CSE returns the resource access response to the AE that requests resource access. For example, the resource access response returned by the H-CSE to the AE may be:

HTTP/1.1302 Move temporarily

Location: http://authzserver.things.com/dynamicauthz # from=/CSE0005/CAE0001 &res_uri=/CSE0003/resource1

A status code of an HTTP response is "302", indicating that the resource access request of the AE needs to be redirected to a new URL. "Location" indicates the redirection URL. The redirection URL points to the dynamic authorization address of the authorization server in the M2M system. For example, http://authzserver.things.com/dynamicauthz is a dynamic authorization address of the authorization server. "# from=/CSE0005/CAE0001&res_uri=/CSE0003/resource1" is parameter information that needs to be attached in a redirected resource access request and is indicated in a query string form. In this example, the attached parameter information is that the access device identifier is "/CSE0005/CAE0001" and that the URI of the accessed resource is "/CSE0003/resource1".

Step 612: The AE sends an authorization request to the resource server, where the authorization request includes the AE-ID1 and the URI of the accessed resource.

After receiving the resource access response of the H-CSE, the AE sends the authorization request to the AS. The redirection URL provided in a Location parameter in the resource access response in step 610 is used in an address of the authorization request.

In an embodiment, the AE receives the resource access response of the H-CSE and detects the HTTP status code. When the status code is "302", the AE sends the authorization request to the AS. For example, the authorization request sent by the AE to the AS is:

GET http://authzserver.things.com /dynamicauthz?from=/CSE0005/CAE0001&res_uri=CSE0003/resource1 HTTP/1.1

"/dynamicauthz?from=/CSE0005/CAE0001&res_uri=CSE0003/resource1" indicates the dynamic authorization address of the authorization server and attached parameter information. The attached parameter information includes the AE-ID1 and the URI of the accessed resource. "Host" describes an address of the authorization server, which is "http://authzserver.thnings.com" in this embodiment. When sending the authorization request to the AS, the AE may directly use a GET request to access the redirection URL provided in the Location parameter in the resource access response, instead of using a Host parameter. For example, the authorization request may be:

GET http://authzserver.things.com/dynamicauthz?from=/CSE0005/CAE0001 &res_uri=/CSE0003/resource1 HTP/1.1

A line break in the end of the first line is merely intended for clear description. During specific implementation, no line break exists between the foregoing two lines of messages.

Step 614: An authorization server returns an authorization response to the AE, where the authorization response includes a flag bit for requesting user authentication.

In an embodiment, after receiving the authorization request of the AE, the AS first detects whether the authorization request includes a parameter related to the user authentication. When the authorization request includes no user authentication information, the authorization response returned by the AS to the AE is:

```
HTTP/1.1 202 Accepted
```

Content-type: application/onem2m-resource+json
{"NeedUserAuthN": "1" }

A status code of an HTTP response is "202", indicating that the authorization request has already been received. However, more information is required for subsequent processing. In an HTTP message body, a ""NeedUserAuthN": "1"" parameter indicates a flag bit for requesting user authentication. The parameter indicates that the AE needs to add user authentication information to a next authorization request.

Step 616: The AE receives the authorization response sent by the authorization server; and when detecting that the response includes the flag bit for requesting user authentication, the AE instructs a user to enter user authentication information into the AE.

In an embodiment, the AE receives the authorization response sent by the AS and detects the HTTP status code. When the status code is "202", the AE continues to detect the HTTP message body. When detecting that the message body includes the "NeedUserAuthN" parameter and that a value of the parameter is "1", the AE instructs the user to enter the user authentication information into the AE. The user herein may select an appropriate input method according to a user interaction capability of a device in which the AE resides. For example, when the device has a user interaction interface (such as a keyboard or a touchscreen), the user may enter an account and a password of the user by using the interaction interface. When the device does not support a user interaction operation, the user may complete input of user information by using another interaction device. In addition, the user may complete input of identity information by using an object such as an identity card that can prove an identity of the user. A manner for entering the user authentication information is out of a discussion scope of the present invention and does not affect the solutions of the present invention. For brevity, in the solutions of the present invention, it is assumed that the device has the user interaction interface, and the user enters an account user1 and a password password1 of the user into the AE by using the interaction interface.

Step 618: The user enters the user authentication information.

Step 620: The AE sends an authorization request to the resource server, where the authorization request includes the AE-ID1, the URI of the accessed resource, and the user authentication information.

In an embodiment, after the user enters the user authentication information of the user into the AE end, the authorization request sent by the AE to the AS is:
GET/dynamicauthz?from=/CSE0005/CAE0001&res_uri=/CSE0003/resource1 HTTP/1.1
  Host: http://authzserver.things.com
  Content-type: application/onem2m-resource+json
  {"user": "user1",
  "password": "password1" }

In comparison with the authorization request in step 612, a parameter related to the user authentication information is added to this authorization request. ""user": "user1"" indicates an account name of the user. ""password": "password1"" indicates a password corresponding to the account name of the user. In this embodiment, the user authentication information is included in an HTTP message body and is encoded by using a JSON format. During actual implementation, the user authentication information may be included in a URL of a GET request in a query string form. This is not limited.

Step 622: The authorization server determines a user identity and a right according to the user authentication information, and generates an access token.

After the AS receives the authorization request of the AE and detects the user authentication information, the AS obtains the user authentication information from the authorization request, verifies the user authentication information in a user information database, and determines whether the user has a right to access the resource. After the user identity and the right are confirmed, the AS generates a token for current authorization.

In an embodiment, after receiving the authorization request of the AE, the AS first detects whether the authorization request includes the parameter related to the user authentication. When a message body of the authorization request includes "user" and "password" parameters, it indicates that the AE requires the user authentication. Then, the AS obtains a parameter value "user1" of "user" and a parameter value "password1" of "password" from the message body of the authorization request, searches the user information database for a user whose account name is "user1", and verifies whether a password of the user is equal to "password1". The user information database is a database in which all user authentication information and access rights in the M2M system are stored. The user authentication information stored in the user information database is related to an authentication method used by the AS. In this embodiment, the AS uses an account name and a password to perform the user authentication in a conventional manner. Therefore, the user authentication information stored in the user information database includes at least an account name and a password of a user. In addition, the user authentication information stored in the user information database may further include a right for the user to access a resource.

When the AS finds, in the user information database, a user record in which an account name is "user1" and a password is equal to "password1", the AS further determines whether the URI of the accessed resource, that is, "/CSE0003/resource1", falls into an access right of the user. A specific representation form of a right is related to a right management manner in the M2M system. In this embodiment, it is assumed that user right information is represented as an accessible resource list in the user information database. The accessible resource list includes URIs of all resources that the user has a right to access. When an accessible resource list recorded by the user in the user information database includes the URI of the accessed resource, the AS authorizes the current authorization request and generates the corresponding access token for the current authorization request. A token generation manner is autonomously determined by the AS. Which token generation method is used does not affect the solutions of the present invention. In this embodiment, it is assumed that the token is indicated by using a string that is randomly generated by the AS and that has a constant length, for example, "2YotnFZFEjr1zCsicMWpAA".

Step 624: The authorization server sends an authorization binding request to the resource server, where the authorization binding request includes the AE-ID1, the token, and the URI of the accessed resource.

After the AS generates the token for the authorization request of the AE, the AS sends the authorization binding request to the H-CSE, to instruct the H-CSE to bind and store authorization information and a corresponding resource. The authorization binding request includes the AE-ID1, the token, and the URI of the accessed resource.

In an embodiment, after the AS generates the token for the authorization request of the AE, the authorization binding request sent by the AS to the H-CSE may be:

PUT http://m2 m.things.com/CSE0003/resource1 HTTP/1.1
From:/CSE0005/CAE0001
Content-type: application/onem2m-resource+json
{"token": "2YotnFZFEjr1zCsicMWpAA" }

A URL in a PUT request indicates the URI that is of the accessed resource and that needs to be updated, that is, "/CSE0003/resource1". "From" indicates the access device identifier, that is, "/CSE0005/CAE0001". In an HTTP message body, ""token": "2YotnFZFEjr1zCsicMWpAA"" indicates that a specific value of the access token corresponding to the access device and the URI of the accessed resource is "2YotnFZFEjr1zCsicMWpAA".

Step 626: The resource server binds an authorization relationship according to the authorization binding request sent by the authorization server.

The H-CSE finds, according to the URI of the accessed resource in the authorization binding request of the AS, the accessed resource stored by the H-CSE. Then, the AS obtains the access device identifier and the access token from the authorization binding request, and stores the access device identifier and the access token in a corresponding resource attribute of the accessed resource.

In an embodiment, after the H-CSE receives the authorization binding request of the AS, the H-CSE obtains the URI of the accessed resource from the authorization binding request, for example, obtains the URI of the accessed resource, that is, "/CSE0003/resource1", from the URL in the PUT request, and finds the accessed resource from a resource locally stored by the H-CSE. Next, the H-CSE obtains the AE-ID1 of the access device and the corresponding token from the authorization binding request, for example, obtains the AE-ID1, that is, "/CSE0005/CAE0001", from a "From" parameter of an HTTP header field in the PUT request, and obtains the access token, that is, "2YotnFZFEjr1zCsicMWpAA", from a "token" parameter in the HTTP message body. Then, the H-CSE stores the AE-ID and the token in the corresponding resource attribute of the accessed resource.

Figure 14:
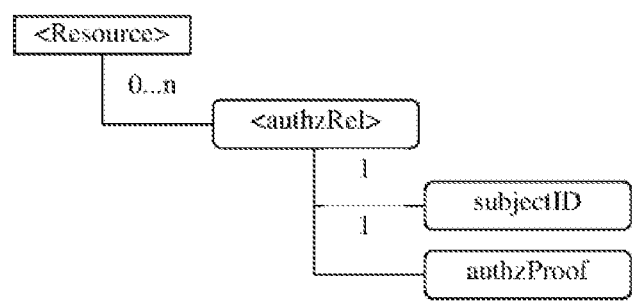
FIG. 14 depicts a Table 8.

In an existing one M2M standard, only an attribute accessControlPolicyIDs corresponding to an access control policy (ACP) is defined for a resource object, and a corresponding resource attribute is not defined for a token-based authorization architecture. Table 8 (FIG. 14) provides a possible authorization relationship binding method. An authorization relationship attribute authzRel is added to a general attribute of a resource, to indicate an authorization relationship bound to the resource.

As shown in Table 8, each resource attribute may include several authzRel attributes, to indicate several authorization relationships bound to the resource, and each authzRel resource is indicated as a two-tuple resource, including two attributes: subjectID (access device identifier) and authzProof (access token).

After obtaining the AE-ID1 and the token parameter from the authorization binding request, the H-CSE constructs an <authzRel> resource instance authzRel1, where a subjectID attribute value of the authzRel1 is equal to "/CSE0005/CAE0001" and an authzProof attribute value is equal to "2YotnFZFEjr1zCsicMWpAA", and then adds the authzRel1 resource to an attribute of a resource corresponding to/CSE0003/resource1, so as to complete binding of the authorization relationship.

Step 628: After completing binding of the authorization relationship, the resource server returns an authorization binding response to the AS.

In an embodiment, after the H-CSE completes binding of the authorization relationship, the authorization binding response returned by the H-CSE to the AS may be:

HTTP/1.1 200 OK

A status code of an HTTP response is "200", indicating that the current authorization relationship is bound successfully.

Step 630: After the authorization server receives the authorization binding response sent by the resource server, the authorization server returns an authorization response to the AE, where the authorization response includes the token, the URI of the accessed resource, and a signature request flag bit.

In an embodiment, after the AS receives the authorization binding response of the H-CSE, the authorization response returned by the AS to the AE may be:

HTTP/1.1 202 Accepted
Content-type: application/onem2m-resource+json
{"token": "2YotnFZFEjr1zCsicMWpAA",
"res_uri": "/CSE0003/resource1",
"SigReq": "1" }

A status code of an HTTP response is "202", indicating that the current authorization request has already been authorized. However, more information is required for subsequent processing. In an HTTP message body, ""token": "2YotnFZFEjr1zCsicMWpAA"" indicates the access token generated in the current authorization, and the AE may use the token to access a corresponding resource next time. ""res_uri": "/CSE0003/resource1"" indicates that the current authorization response is intended for "/CSE0003/resource1". The token is used for the resource access. The res_uri parameter is mainly used for a case in which the AS simultaneously processes multiple authorization requests initiated by the AE. The res_uri parameter is used to ensure that the AE can differentiate authorization response messages. ""SigReq": "1"" is a signature request flag bit, indicating that the AE needs to further provide token signature data, so as to store, in the AS end, a signature of verification information associated with the current authorization.

Step 632: The AE stores the access token and uses a device factory key to sign the access token.

After the AE receives the authorization response of the AS, the AE first obtains the token and the URI of the accessed resource from the authorization response, and binds and locally stores the token and the URI of the accessed resource. Then, if the AE detects that the authorization response includes the signature request flag bit, the AE uses the device factory key to sign the received token.

Specifically, after the AE receives the authorization response of the AS, the AE first obtains the token and the URI of the accessed resource from the authorization response, that is, obtains the access token "2YotnFZFEjr1zCsicMWpAA" from a "token" parameter in the HTTP response message body and obtains the URI of the accessed resource, that is, "/CSE0003/resource1", from the "res_uri" parameter, and binds and locally stores the access token and the URI of the accessed resource. A storage method may be implemented by using an access token mapping table, or another storage manner is used. During specific implementation, which storage method is used does not affect the solutions of the present invention. In this embodiment, it is assumed that the AE end uses an access token mapping table to store a correspondence between the URI of the accessed resource and the token. As shown in the following Table 9, each row in Table 9 indicates a piece of authorization already obtained by the AE.

tionship includes at least the access device identifier, the token, the token signature, and the URI of the accessed resource. Then, the AS adds the generated authorization relationship to the authorization relationship mapping table. A structure of the authorization relationship mapping table may be shown in Table to.

TABLE 10

Authorization relationship mapping table

| Access device identifier | Token | Token signature | URI of the accessed resource |
|---|---|---|---|
| /CSE0003/CAE0002 | czZCaGRSa3F0MzpnWDFmQmF0M2JW | 7432A8D9 | /CSE0002/resource3 |
| /CSE0005/CAE0001 | 2YotnFZFEjr1zCsicMWpAA | 8456B1CD | /CSE0003/resource1 |

TABLE 9

Access token mapping table

| URI of the accessed resource | Token |
|---|---|
| /CSE0003/resource1 | 2YotnFZFEjr1zCsicMWpAA |
| /CSE0004/resource2 | tGzv3JOkFoXG5Qx2TlKWIA |

Then, the AE detects whether the authorization response includes the signature request flag bit "SigReq". When the authorization response includes the "SigReq" parameter and a value of the "SigReq" parameter is "1", the AE uses a preset signature algorithm and the device factory key to sign the token. The signature algorithm may be a general signature algorithm such as a MAC or an HMAC. During specific implementation, which signature algorithm is used does not affect the solutions of the present invention. In this embodiment, it is assumed that the AE uses a MAC signature algorithm and a signature obtained by calculating the foregoing token is "8456B1CD".

Step 634: After the AE completes signing of the token, the AE initiates a signature binding request to the authorization server, where the request includes the AE-ID1, the token, a token signature, and the URI of the accessed resource.

Specifically, after the AE completes signing of the token, the signature binding request initiated by the AE to the AS may be:

PUT http://authzserver.things.com/dynamicauthz HTTP/1.1
From:/CSE0005/CAE0001
Content-type: application/onem2m-resource+json
{"token": "2YotnFZFEjr1zCsicMWpAA",
"token_sig": "8456B1CD",
"res_uri": "/CSE0003/resource1" }

A URL address, that is, "http://authzserver.things.com/dynamicauthz" in a PUT request, is the dynamic authorization address of the AS. "From" indicates the identifier of the access device initiating the signature binding request. In an HTTP message body, "token" and "token_sig" parameters respectively indicate the token on which signature binding need to be performed and the token signature.

Step 636: After receiving the signature binding request of the AE, the authorization server generates a corresponding authorization relationship and stores the authorization relationship in an authorization relationship mapping table.

Specifically, after receiving the signature binding request of the AE, the AS first generates an authorization relationship for the current authorization. The authorization rela- As shown in Table 10, each row in this table indicates an authorization relationship. After the AS receives the signature binding request of the AE, the AS obtains a corresponding parameter value from the signature binding request of the AE and adds the value to a corresponding authorization relationship. In this embodiment, the AS generates the corresponding authorization relationship and adds the authorization relationship to the authorization relationship mapping table, as described in the second record in Table 10.

Figure 15:
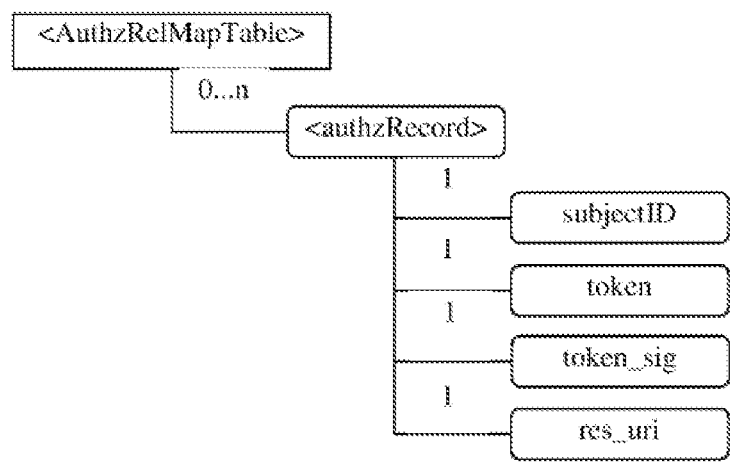
FIG. 15 depicts a Table 15.

During specific implementation, the foregoing authorization relationship mapping table may be maintained by using a common database inside the AS, or described as a RESTful resource AuthzRelMapTable. In the token-based authorization architecture, the AuthzRelMapTable resource may be indicated in a form shown in Table 11 (FIG. 15).

AuthzRelMapTable is an authorization relationship mapping table resource. The resource includes several authorization relationship attributes, that is, an authzRecord resource. authzRecord is an authorization relationship resource. The resource includes the following attributes:

subjectID: corresponds to an access device identifier in Table 10;

token: corresponds to a token attribute in Table 10;

token_sig: corresponds to a token signature attribute in Table 10; and res_uri: corresponds to a URI attribute of an accessed resource in Table 10.

It should be noted that a specific representation form of the authorization relationship mapping table is not limited in the present invention.

Step 638: The authorization server returns a signature binding response to the AE.

In an embodiment, after the AS completes storage of the authorization relationship, the signature binding response returned by the AS to the AE may be:

HTTP/1.1 200 OK

A status code of an HTTP response is "200", indicating that the current signature binding request has already been completed, and the AE may use the token to access the corresponding resource.

In this embodiment of the present invention, when the resource server determines that the received resource access request includes no access token, the resource access response returned by the resource server to the access device carries a URI of the authorization server, so that the access device applies to the authorization server for authentication authorization. The authorization server verifies that the user authentication information is valid, and generates the access token. The authorization server sends the access device identifier, the URI of the accessed resource, and the generated access token to the resource server, so that the resource server generates the corresponding authorization relationship. The authorization server sends the generated access token and the URI of the accessed resource to the AE, and requests the AE to sign the access token. The AE stores a correspondence between the URI of the accessed resource and the access token. The authorization server stores a correspondence between the access device identifier, the URI of the accessed resource, the access token, and a signature of the access token in the authorization relationship mapping table.

When the accessed resource needs to be accessed subsequently, a corresponding access token needs to be carried in a resource access request. When the AE accesses the accessed resource subsequently, if the access device identifier changes, the resource server may determine, according to a locally existing authorization relationship in which a URI of an accessed resource and an access token are consistent but an access device identifier is inconsistent with those in the resource access request, that the access device identifier may change, and trigger an authorization update procedure.

Figure 7:
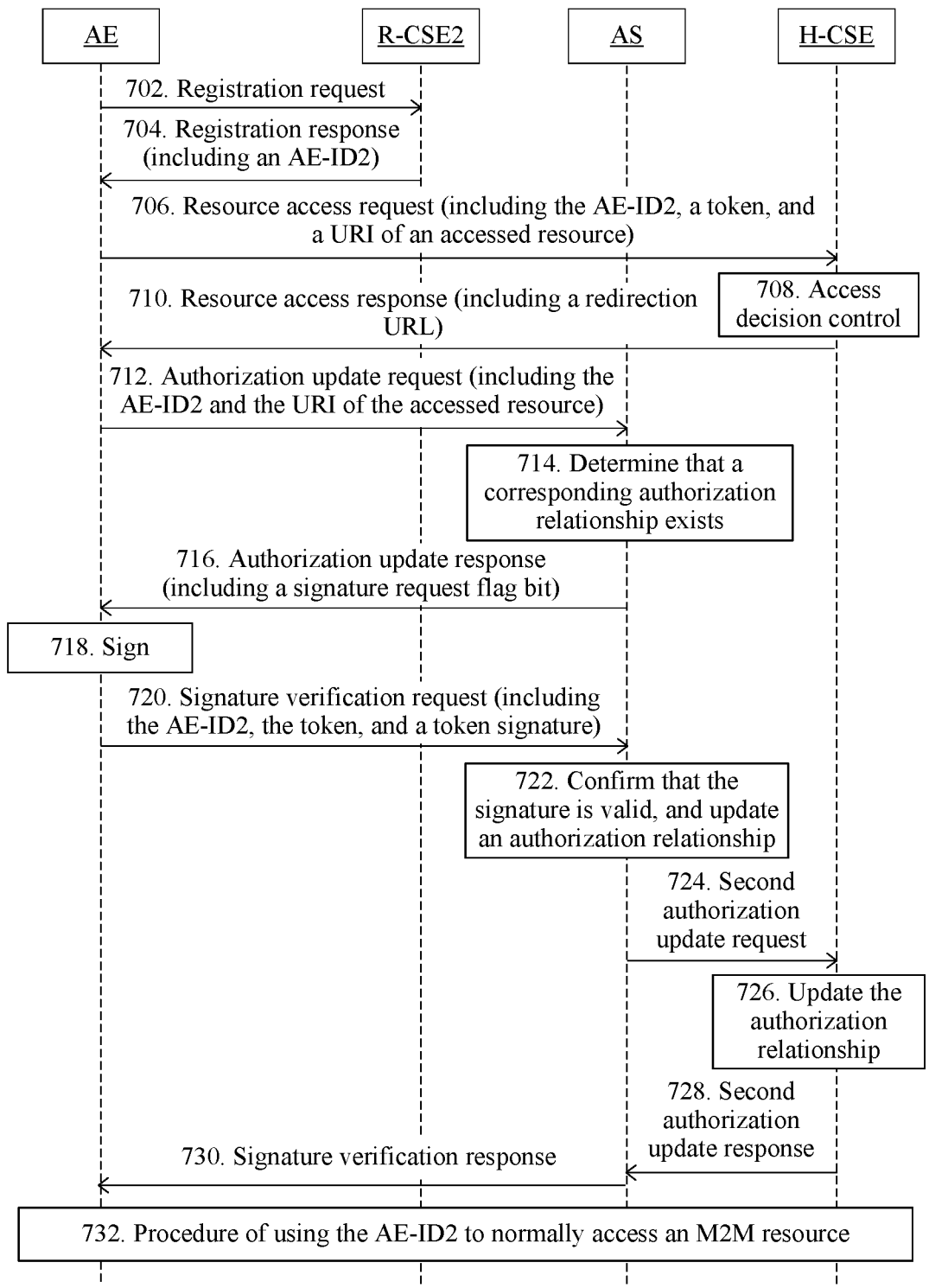
FIG. 7 is a flowchart of authorization update performed based on an OAuth authorization architecture according to an embodiment of the present invention.

Referring to FIG. 7, FIG. 7 is a flowchart of authorization update performed based on an OAuth authorization architecture according to an embodiment of the present invention. When an AE in the embodiment in FIG. 6A and FIG. 6B registers with a different registrar (for example, an R-CSE2) for a reason such as an access location change, the new registrar R-CSE2 may allocate a new identifier AE-ID2 to the AE. Consequently, an existing authorization relationship in an M2M system becomes ineffective. The method in FIG. 7 is a method for updating an authorization relationship after an access identifier changes. The method includes the following steps.

Step 702 and Step 704: The AE initiates a registration request to the registrar 2 (R-CSE2), and the registrar 2 allocates the identifier AE-ID2 to the AE.

Step 706: The AE locally finds, according to a URI of an accessed resource, a token corresponding to the resource, and sends a resource access request to a resource server (H-CSE), where the resource access request includes the AE-ID2, the URI of the accessed resource, and the token corresponding to the URI of the accessed resource.

In an embodiment, as described in step 632 of the method in FIG. 6A and FIG. 6B, after initial authorization is performed, the AE stores a correspondence between the URI of the accessed resource and the access token. The AE first finds the corresponding token from locally stored authorization information according to the URI of the accessed resource, and then the AE sends the resource access request to the H-CSE.

Step 708: The resource server receives the resource access request sent by the AE, and makes an access control decision.

In an embodiment, as described in step 626, the resource server stores an authorization relationship between a URI of an accessed resource, an AE-ID1, and a corresponding access token. The H-CSE parses the resource access request to obtain the URI of the accessed resource, the AE-ID2, and the token. When the H-CSE determines that the accessed resource exists locally, if the H-CSE finds, in an authorization relationship attribute (authzRel) of the accessed resource, an authorization record in which an authzProof attribute value is the same as the token, while a subjectID attribute value is different from the AE-ID2, the resource server starts an authorization update procedure.

Step 710: The resource server returns a resource access response to the AE, where the response includes a redirection response code and a redirection URL, and the redirection URL points to an authorization update port of an authorization server in the M2M system.

In an embodiment, the H-CSE returns the resource access response to the AE. For example, the resource access response returned by the H-CSE to the AE may be:

HTTP/1.1 302 Move temporarily
Location: http://authzserver.things.com/authzupdate # from=/CSE0006/CAE0003& res_uri=/CSE0003/resource1&token=2YotnFZFEjr1zCsicMWpAA A status code of an HTTP response is "302", indicating that the resource access request of the AE needs to be redirected to a new URL. "Location" indicates the redirection URL. The redirection URL points to the authorization update port of the authorization server in the M2M system. For example, http://authzserver.things.com/authzupdate is a dynamic authorization address of the authorization server. "# from=/CSE0006/CAE0003&res_uri=/CSE0003/resource1&token=2YotnFZFEjr1zCsicMWp AA" is parameter information that needs to be attached in a redirected resource access request and is indicated in a query string form. For specific content of the foregoing attached parameter information, refer to descriptions in step 510. Details are not described in this embodiment of the present invention.

Step 712: The AE receives the resource access response of the resource server, and sends an authorization update request to the authorization server (AS), where a URL provided in a Location parameter in the response is used in an address of the authorization update request.

In an embodiment, the AE receives the resource access response of the H-CSE and detects the HTTP status code. When the status code is "302", the AE sends the authorization update request to the AS. For example, the authorization update request sent by the AE to the AS is:

GET/authzupdate?from=/CSE0006/
CAE0001&res_uri=CSE0003/resource1
&token=2YotnFZFEjr1zCsicMWpAA HTTP/1.1
Host: http://authzserver.things.com The Location parameter in a redirection response is divided into two parts: A URL address "/authzupdate-?from=/CSE0006/CAE0001&res_uri=CSE0003/
resource1&token=2YotnFZFEjr 1zCsicMWpAA" in a GET request indicates a local authorization update port address of the authorization server and attached parameter information; and "Host" describes an address of the authorization server, which is "http://authzserver.thnings.com" in this embodiment. When sending the authorization update request to the AS, the AE may directly use the GET request to access the redirection URL provided in the Location parameter in the redirection response, instead of using a Host parameter. For example, the authorization update request may be:

GET http://authzserver.things.com/authzupdate?from=/
CSE0006/CAE0001
&res_uri=/CSE0003/
resource1&token=2YotnFZFEjr1zCsicMWpAA HTTP/1.1

Step 714: After receiving the authorization update request of the AE, the authorization server determines a locally existing authorization relationship corresponding to the token in the authorization update request.

In an embodiment, after the AS receives the authorization update request of the AE, the AS first parses a query string of the authorization update request to obtain the token and the URI of the accessed resource. For example, the token is "2YotnFZFEjr1zCsicMWpAA", and the URI of the accessed resource is "/CSE0003/resource1". Then, the AS searches a locally stored authorization relationship mapping table for an authorization relationship in which a value of a "Token" column is "2YotnFZFEjr1zCsicMWpAA" and a value of a "URI of the accessed resource" column is "/CSE0003/resource1". When the authorization relationship mapping table is implemented by using a RESTful resource AuthzRelMapTable described in Table 11 in step 636, an AuthzRelMapTable attribute is searched for an authzRecord authorization relationship in which a token value is equal to "2YotnFZFEjr1zCsicMWpAA" and res_uri is equal to "/CSE0003/resource1". If there is no authorization record that satisfies the foregoing condition, the AS rejects the authorization update request of the AE, and returns, to the AE, an authorization update failure response: HTTP/1.1404 Not Found. A status code of an HTTP response is "404", indicating that the AS finds no corresponding authorization record. If there is an authorization relationship that satisfies the condition, the AS returns an authorization update response to the AE, to request the AE to sign the token.

Step 716: The authorization server returns an authorization update response to the AE, where the response includes an HTTP 202 response code, the token, and a signature request flag bit.

In an embodiment, after the AS starts the authorization update procedure, the authorization update response returned by the AS to the AE is:

HTTP/1.1 202 Accepted
Content-type: application/onem2m-resource+json
{"token": "2YotnFZFEjr1zCsicMWpAA",
"SigReq": "1" }

A status code of an HTTP response is "202", indicating that the AS has already accepted the authorization update request of the AE. However, more information is required for subsequent processing. In an HTTP message body, ""token": "2YotnFZFEjr1zCsicMWpAA"" indicates that signing is requested for the authorization relationship corresponding to the token. The AE needs to sign verification information corresponding to the authorization relationship. In this embodiment, the verification information is the token. During specific implementation, other information (for example, an original AE-ID) may be used as the verification information. This depends on a specific implementation of the authorization update port of the AS. In the HTTP message body, ""SigReq": "1"" is a signature request flag bit, indicating that the AE needs to further provide token signature data, so that the AS can confirm an identity of the AE.

It should be noted that during specific implementation, the verification information token is not mandatory in the authorization update response.

Step 718: When detecting that the received resource access response includes the signature request flag bit, the AE uses a device factory key to sign the received token.

In an embodiment, after the AE receives the resource access response of the H-CSE, when the AE detects that the status code of the HTTP response is "202" and that the HTTP message body includes a "SigReq" parameter with a value "1", the AE signs the token.

Step 720: After the AE completes signing of the token, the AE initiates a signature verification request to the authorization server, where the request includes the AE-ID2, the token, and a token signature.

In an embodiment, after the AE completes signing of the token, the signature verification request initiated by the AE to the AS is:

PUT http://authzserver.things.com/authzupdate HTTP/1.1
From:/CSE0006/CAE0001
Content-type: application/onem2m-resource+json
{"token": "2YotnFZFEjr1zCsicMWpAA",
"token_sig": "8456B1CD",
"res_uri": "/CSE0003/resource1" }

For an explanation of each parameter, refer to descriptions in step 634. Details are not described in this embodiment of the present invention.

Step 722: The authorization server obtains the token and the token signature from the signature verification request of the AE, then searches an authorization relationship mapping table for an authorization relationship corresponding to the token, and verifies whether the token signature in the signature verification request is consistent with a token signature in the authorization relationship.

In an embodiment, when the AS receives the signature verification request of the AE, the AS first parses the signature verification request of the AE to obtain a token value "2YotnFZFEjr1zCsicMWpAA" and a token signature value "8456B1CD". Then, the AS searches the locally stored authorization relationship mapping table for an authorization relationship in which a value in the "Token" column is equal to "2YotnFZFEjr1zCsicMWpAA", and compares whether a "Token signature" column of the authorization relationship is equal to "8456B1CD". If the "Token signature" column in a corresponding authorization record is not equal to "8456B1CD", the AS returns a signature verification failure response to the AE. The response includes an HTTP 403 response code, for example, HTTP/1.1 403 Forbidden. If the "Token signature" column is equal to "8456B1CD", the AS updates the authorization relationship, that is, changes an access device identifier AE-ID1 in the authorization relationship corresponding to the token to the current access device identifier AE-ID2.

Step 724: The authorization server sends a second authorization update request to the resource server, where the request includes the URI of the accessed resource, the token, and the AE-ID2.

In an embodiment, when the AS updates the authorization record, the authorization update request initiated by the AS to the H-CSE may be:

PUT http://m2 m.things.com/CSE0003/resource1 HTTP/1.1
From: /CSE0006/CAE0003
Content-type: application/onem2m-resource+json
{"token": "2YotnFZFEjr1zCsicMWpAA" }

A URL in a PUT request indicates the URI that is of the accessed resource and that needs to be updated, that is, "/CSE0003/resource1". "From" indicates the new access device identifier AE-ID2, that is, "/CSE0006/CAE0003". In an HTTP message body, ""token": "2YotnFZFEjr1zCsicMWpAA"" indicates that a specific value of the access token corresponding to the access device and the URI of the accessed resource is "2YotnFZFEjr1zCsicMWpAA".

Step 726: After receiving the second authorization update request of the authorization server, the resource server finds, according to the URI of the accessed resource, an accessed resource resource1 that is locally stored, searches an authorization relationship attribute of the resource1 for an authorization record in which an access token is the token, and updates an access device identifier in the authorization record to the AE-ID2.

In an embodiment, after the H-CSE receives the authorization update request of the AS, the H-CSE first obtains the URI of the accessed resource, that is, "/CSE0003/resource1", from the URL of the authorization update request, and locally finds the resource resource1. Then, the H-CSE separately parses a "From" header field in the authorization update request and the HTTP message body to obtain values of the token and AE-ID2, that is, the token is "2YotnFZFEjr1zCsicMWpAA" and the AE-ID2 is "/CSE0006/CAE0001", searches the authorization relationship attribute of the resource1 for the authorization record in which the access token is the token, and updates the access device identifier in the authorization record to the AE-ID2. In an embodiment, the H-CSE searches an authzRel attribute of the resource1 for an authorization record in which an authzProof attribute value is equal to "2YotnFZFEjr1zCsicMWpAA", and then changes a corresponding subjectID attribute value in the authorization record to "/CSE0006/CAE0003".

Step 728: After completing local authorization update, the resource server returns a second authorization update response to the authorization server, where the response includes an HTTP 200 status code.

In an embodiment, after the H-CSE completes the local authorization update, the authorization update response returned by the H-CSE to the AS is:

HTTP/1.1 200 OK

A status code of an HTTP response is "200", indicating that the H-CSE has already completed the authorization update corresponding to the resource.

Step 730: The authorization server returns a signature verification response to the AE, where the response includes an HTTP 200 response code.

Specifically, after the AS receives the authorization update response of the H-CSE, the signature verification response returned by the AS to the AE is:

HTTP/1.1 200 OK

A status code of an HTTP response is "200", indicating that the AS has already completed signature verification and the M2M system has already completed authorization update.

Step 732: After the AE determines that the M2M system has already completed the authorization update, the AE may initiate a resource access request to the H-CSE according to an existing resource access procedure, and obtain a corresponding resource.

In this embodiment of the present invention, when an M2M device, such as the AE, in the M2M system accesses an accessed resource after an identifier changes, the resource server triggers an authorization relationship update procedure. The M2M system determines an identity of an access device by verifying a signature of verification information (token signature) of the access device, and updates an existing authorization relationship. Therefore, the M2M device can implement seamless resource access, and service continuity of the M2M system is ensured.

It can be learned from the authorization processing method in FIG. 6A and FIG. 6B that when the OAuth authorization architecture is used in the M2M system to authorize resource access of an access device, the authorization server stores an authorization relationship corresponding to an access device identifier, a token, a token signature, and a URI of an accessed resource. The resource server stores an authorization relationship corresponding to the access device identifier, the token, and the URI of the accessed resource. When access to the accessed resource is requested from the resource server after the access device identifier changes, the resource server rejects the access, and redirects a resource access request of the access device to the authorization server for authorization update. The authorization server determines an identity of the access device according to a signature of verification information, that is, the token signature, and further updates an authorization relationship in the M2M system. Actually, the resource server may verify the identity of the access device, and further update the authorization relationship in the M2M system.

Figure 8:
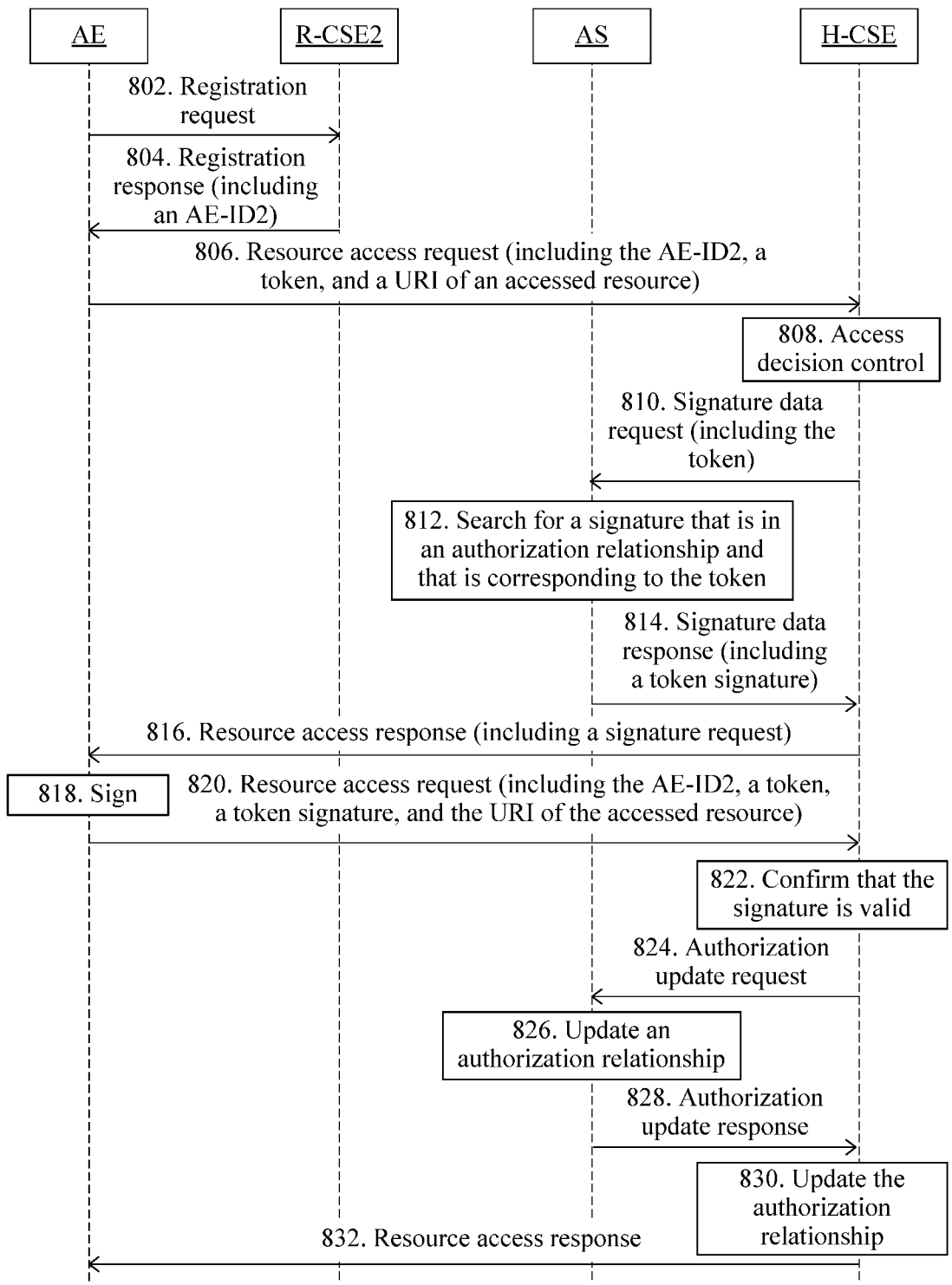
FIG. 8 is a flowchart of another authorization update performed based on an OAuth authorization architecture according to an embodiment of the present invention.

Referring to FIG. 8, FIG. 8 is a flowchart of another authorization update performed based on an OAuth authorization architecture according to the present invention.

Step 802 to step 808 are the same as step 702 to step 708 in the embodiment in FIG. 7. For related descriptions, refer to related steps in the embodiment in FIG. 7. Details are not described herein again.

Step 810: A resource server sends a signature data request to an authorization server (AS), where the request includes a token.

In an embodiment, when the H-CSE initiates an authorization update procedure, the signature data request sent by the H-CSE to the authorization server is:

GET http://authzserver.things.com/sigquery?token=2YotnFZFEjr1zCsicMWpAA HTTP/1.1

"http://authzserver.things.com/sigquery" is a signature data request port address of the authorization server. "?token=2YotnFZFEjr1zCsicMWpAA" is the corresponding access token for which signing is requested, and is indicated in a query string form.

Step 812: The authorization server obtains, from a local authorization relationship mapping table, a signature that is in an authorization relationship and that corresponds to the token in the signature data request.

In an embodiment, after receiving the signature data request of the H-CSE, the AS first parses the query string in the signature data request to obtain a token value, for example, "2YotnFZFEjr1zCsicMWpAA". Then, the AS searches the locally stored authorization relationship mapping table, to search a "Token" column for an authorization relationship in which a token is the same as that in the signature data request, and obtains a "Token signature" value in the corresponding authorization relationship. For example, in an authorization relationship mapping table (Table 10) described in step 636, a "Token" column is searched for an authorization relationship in which a value is equal to "2YotnFZFEjr1zCsicMWpAA", and then a "Token signature", that is, "8456B1CD", in the authorization relationship is extracted.

Step 814: The authorization server returns a signature data response to the resource server, where the signature data response includes a token signature.

In an embodiment, the signature data response returned by the AS to the H-CSE is:

HTTP/1.1 200 OK
Content-type: application/onem2m-resource+json
{"token_sig": "8456B1CD" }

A status code of an HTTP response is "200", indicating that the current signature data request has already been authorized. In an HTTP message body, ""token_sig": "8456B1CD"" indicates that a requested token signature value is "8456B1CD".

Step 816: The resource server returns a resource access response to an AE, where the response includes a signature request flag bit.

In an embodiment, after the H-CSE receives the signature data response of the AS, the resource access response returned by the H-CSE to the AE may be:

HTTP/1.1 202 Accepted

Content-type: application/onem2m-resource+json
{"token": "2YotnFZEjr1zCsicMWpAA",
"SigReq": "1" }

A status code of an HTTP response is "202", indicating that the current resource access request has already been processed. However, more information is required for subsequent processing. In an HTTP message body, ""token": "2YotnFZEjr1zCsicMWpAA" indicates that signature data needing to be provided by the AE corresponds to the token. The parameter is mainly used for a case in which the H-CSE simultaneously processes multiple resource access requests initiated by the AE, and the parameter is used to ensure that the AE distinguishes different resource access response messages. ""SigReq": "1"" is a signature request flag bit, indicating that the AE needs to further provide token signature data, so that the H-CSE can confirm an identity of the AE.

Step 818: When detecting that the received resource access response includes the signature request flag bit, the AE uses a device factory key to sign the received token.

This step is the same as step 718. Refer to a related description in step 718. Details are not described herein again.

Step 820: After the AE completes signing of the token, the AE re-initiates a resource access request to the H-CSE, where the request includes an AE-ID2, a token obtained during initial authorization, a token signature, and a resource URI.

In an embodiment, after the AE completes signing of the token, the resource access request initiated by the AE to the H-CSE may be:

GET http://m2 m.things.com/CSE0003/resource1?from=/CSE0006/CAE0001
&token=2YotnFZEjr1zCsicMWpAA&token_sig=8456B1CD HTTP/1.1

In comparison with the resource access request described in step 806, an access token signature parameter, that is, "token_sig=8456B1CD", is added to information carried in the resource access request in this step. "token_sig=8456B1CD" indicates that the current resource access request not only carries the access token, but also carries signature data corresponding to the access token.

Step 822: After receiving the resource access request of the AE, the H-CSE obtains the token signature from the resource access request, and determines whether the token signature is the same as the token signature obtained from the authorization server in step 814.

In an embodiment, after the H-CSE receives the resource access request of the AE, the H-CSE first parses an HTTP message body in the resource access request to obtain the token signature, that is, obtain a value "8456B1CD" corresponding to a "token_sig" parameter. Then, the H-CSE compares the token signature in the resource access request with the token signature in the signature data response in step 814. For example, values of both the foregoing token signatures are "8456B1CD" in this embodiment. When the token signatures are the same, the H-CSE confirms that an access device of the resource access request, that is, the AE, and an AE in the initial authorization are a same access device. If the token signatures are different, the resource server rejects access of the access device, and a procedure terminates.

Step 824: After the resource server confirms that the signature is valid, the H-CSE initiates an authorization update request to the AS, where the request includes the token and the AE-ID2.

In an embodiment, after the H-CSE confirms a correspondence between the AE and the access device in the initial authorization, the authorization update request initiated by the H-CSE to the AS may be:

PUT http://authzserver.things.com/authzupdate HTTP/1.1
From: /CSE0006/CAE0001
Content-type: application/onem2m-resource+json
{"token": "2YotnFZEjr1zCsicMWpAA" }

A URL address in a PUT request, that is, "http://authzserver.things.com/authzupdate", is an authorization update port address of the AS. "From" indicates a new identifier AE-ID2, that is, "/CSE0006/CAE0003", of the access device that requires authorization update. In an HTTP message body, "token" indicates a value of a corresponding token in an authorization relationship that needs to be updated. That is, a token value in the authorization relationship that needs to be updated is "2YotnFZEjr1zCsicMWpAA". This parameter is used to ensure that the AS finds the authorization relationship that needs to be updated.

Step 826: The authorization server updates the locally stored authorization relationship mapping table.

In an embodiment, after receiving the authorization update request of the H-CSE, the AS first parses the authorization update request to obtain the new identifier "/CSE0006/CAE0003" of the access device and the token value "2YotnFZEjr1zCsicMWpAA" in the authorization relationship corresponding to the current resource access request. Then, the AS searches the locally stored authorization relationship mapping table for an authorization relationship in which a value of a "Token" column is "2YotnFZEjr1zCsicMWpAA". The authorization relationship mapping table is as described in Table to in step 636. After finding the corresponding authorization relationship, the AS replaces an original value "/CSE0005/CAE0001" of an "access device identifier" column in the authorization relationship with the new identifier "/CSE0006/CAE0003" in the authorization update request. When the authorization relationship mapping table is implemented by using a RESTful resource AuthzRelMapTable described in step 636, the authorization update is that an AuthzRelMapTable attribute is searched for an authzRecord authorization relationship in which a token value is equal to "2YotnFZEjr1zCsicMWpAA" and that a subjectID in the authorization relationship is updated to "/CSE0006/CAE0003".

Step 828: After completing updating of the authorization relationship mapping table, the authorization server returns an authorization update response to the resource server.

In an embodiment, after the AS completes updating of the authorization relationship mapping table, the authorization update response returned by the AS to the H-CSE is:

HTTP/1.1 200 OK

A status code of an HTTP response is "200", indicating that the AS has already successfully updated the authorization relationship mapping table.

Step 830: After receiving the authorization update response of the authorization server, the resource server updates an authorization relationship associated with an accessed resource.

In an embodiment, after receiving the authorization update response of the AS, the H-CSE searches an authzRel attribute of the accessed resource for an authorization relationship in which authzProof is equal to the token ("2YotnFZFEjr1zCsicMWpAA"), and updates a subjectID value in the authorization relationship to "/CSE0006/CAE0003".

Step 832: After completing updating of the authorization relationship associated with the accessed resource, the resource server returns a resource access response to the AE according to a common resource access procedure.

In an embodiment, after the H-CSE completes updating of the authorization relationship associated with the accessed resource, the resource access response returned by the H-CSE to the AE may be:

HTTP/1.1 200 OK
Content-type: application/onem2m-resource+json
{"content": "xxxxxxxxxxxxx"}

A status code of the response is "200", indicating that the H-CSE has already authorized the current resource access request of the AE. An HTTP message body includes resource content requested by the AE. In this embodiment, ""content": "xxxxxxxxxxxxx"" merely indicates that the resource content is included in the HTTP message body and is returned to the AE. A specific returning format and content are determined according to a type of the accessed resource. This is not limited.

In this embodiment of the present invention, when an M2M device, such as the AE, in an M2M system accesses an accessed resource after an identifier changes, the resource server triggers an authorization relationship update procedure. The M2M system determines an identity of an access device by verifying a signature of verification information (token signature) of the access device, and updates an existing authorization relationship. Therefore, the M2M device can implement seamless resource access, and service continuity of the M2M system is ensured.

Figure 9:
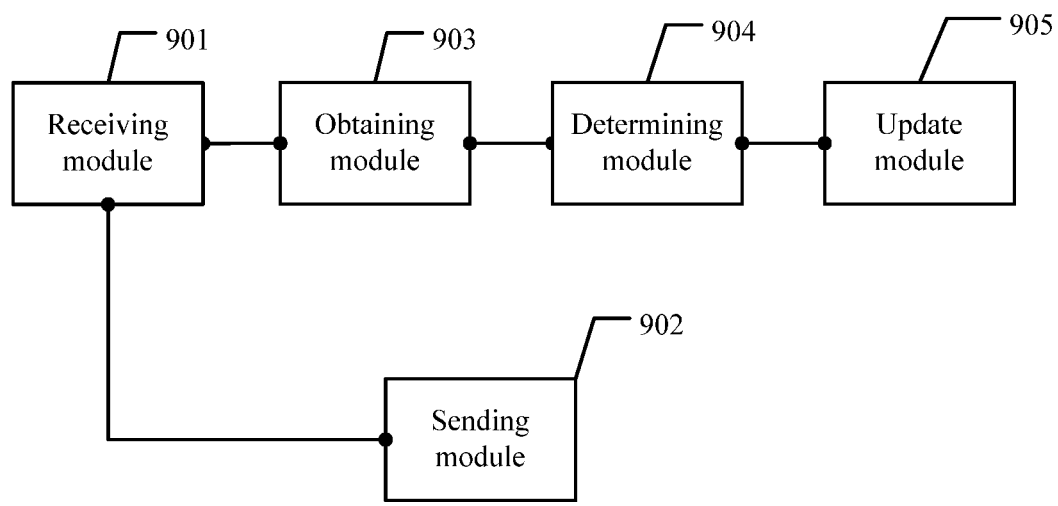
FIG. 9 is a schematic structural diagram of an authorization server according to an embodiment of the present invention.

In the embodiments of the present invention, an authorization server that belongs to a same inventive concept as the embodiment shown in FIG. 2 is further described. As shown in FIG. 9, FIG. 9 is a schematic structural diagram of an authorization server according to an embodiment of the present invention. The authorization server may include a receiving module 901, a sending module 902, an obtaining module 903, a determining module 904, and an update module 905.

The receiving module 901 is configured to receive a first authorization update request sent by an access device, where the first authorization update request includes a first identifier of the access device.

The sending module 902 is configured to send a first authorization update response to the access device, where the first authorization update response includes signature request information, and the signature request information instructs the access device to sign verification information.

The receiving module 901 is further configured to receive a signature verification request sent by the access device, where the signature verification request includes the first identifier, the verification information, and a signature of the verification information, and the signature of the verification information is generated by the access device by signing the verification information by using a key.

The obtaining module 903 is configured to obtain a stored first authorization relationship according to the verification information in the signature verification request received by the receiving module.

The determining module 904 is configured to determine, according to the signature of the verification information in the received signature verification request and a signature of verification information stored in the first authorization relationship, that the signature of the verification information in the signature verification request is valid.

The update module 905 is configured to update the first authorization relationship according to the first identifier.

The update module is configured to change a second identifier in the first authorization relationship to the first identifier, where the second identifier is an identifier that has been used by the access device.

In an embodiment, the authorization server further includes an initial authorization module, configured to perform initial authorization on access of the access device to a resource corresponding to an identifier of an accessed resource.

Optionally, when the verification information is the second identifier stored by the access device, the signature verification request further includes a signature of the first identifier. The signature of the first identifier is generated by the access device by signing the first identifier by using the key. The update module 905 is further configured to change the signature of the verification information stored in the first authorization relationship to the signature of the first identifier. The initial authorization module is configured to: send a resource creation request to a resource server, where the resource creation request includes a preset access control policy and the identifier of the accessed resource, and the preset access control policy includes the second identifier; receive a resource creation response sent by the resource server, where the resource creation response indicates that the resource server successfully creates the access control policy resource and successfully binds the access control policy resource to the resource corresponding to the identifier of the accessed resource, and the access control policy resource is used to record the preset access control policy; send a signature request to the access device, where the signature request instructs the access device to sign the second identifier; receive a signature response sent by the access device, where the signature response includes a signature of the second identifier; and store the first authorization relationship, where the first authorization relationship includes a correspondence between the second identifier, the signature of the second identifier, and the identifier of the accessed resource. Optionally, the sending module 902 is further configured to: send a second authorization update request to the resource server after the first authorization relationship is updated according to the first identifier, where the second authorization update request includes the first identifier, the second identifier, and the identifier of the accessed resource, so that the resource server obtains a locally stored second authorization relationship according to the second identifier and the identifier of the accessed resource, and update the second identifier in the second authorization relationship to the first identifier.

Optionally, when the verification information is an authorization credential, the first authorization update request further includes the authorization credential, and the determining module 904 is further configured to determine, according to the authorization credential before the first authorization update response is sent to the access device, that the first authorization relationship including the authorization credential exists and that an access device identifier bound in the first authorization relationship is not the first identifier. The initial authorization module is configured to: receive an authorization request of the access device, where the authorization request includes the second identifier, the identifier of the accessed resource, and authentication information that a user consents to resource access of the access device; generate the authorization credential when it is determined, according to the authentication information, that the user has a right to access the resource corresponding to the identifier of the accessed resource; send an authorization binding request to a resource server in which the resource corresponding to the identifier of the accessed resource is located, where the authorization binding request includes the second identifier, the authorization credential, and the identifier of the accessed resource; receive an authorization binding response sent by the resource server, where the authorization binding response includes information indicating that binding the second identifier, the authorization credential, and the identifier of the accessed resource is successful; send an authorization response to the access device, where the authorization response includes the authorization credential, the identifier of the accessed resource, and information instructing to sign the authorization credential; receive a signature binding request sent by the access device, where the signature binding request includes the second identifier, the authorization credential, a signature of the authorization credential, and the identifier of the accessed resource, and the signature of the authorization credential is generated by the access device by signing the authorization credential by using the key; and store the first authorization relationship, where the first authorization relationship includes a correspondence between the second identifier, the authorization credential, the signature of the authorization credential, and the identifier of the accessed resource. Optionally, the sending module 902 is further configured to: send a second authorization update request to the resource server after the first authorization relationship is updated according to the first identifier, where the second authorization update request includes the first identifier, the authorization credential, and the identifier of the accessed resource, so that the resource server obtains the second authorization relationship according to the authorization credential and the identifier of the accessed resource, and update the second identifier in the second authorization relationship to the first identifier.

Figure 10:
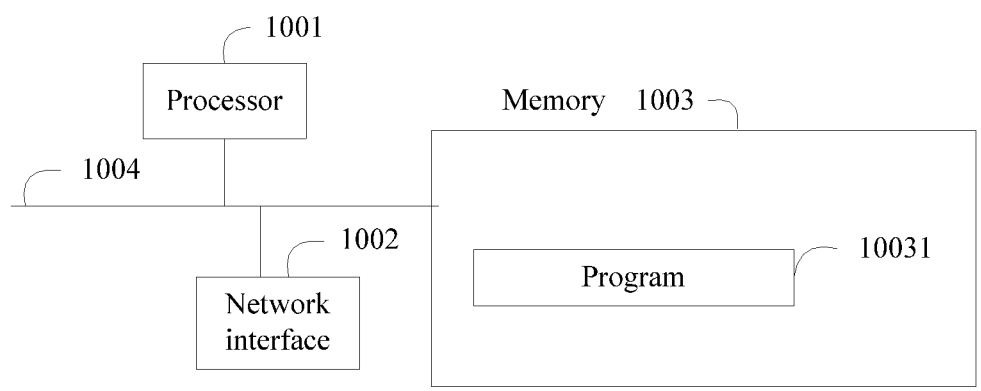
FIG. 10 is a schematic structural diagram of another authorization server according to an embodiment of the present invention.

FIG. 10 describes a structure of an authorization server according to another embodiment of the present invention. The authorization server is configured to perform the authorization processing methods implemented by the authorization server in the foregoing embodiments in FIG. 2, FIG. 4, FIG. 5, FIG. 6A and FIG. 6B, and FIG. 7, and includes at least one processor 1001 (for example, a CPU), at least one network interface 1002 or another communications interface, a memory 1003, and at least one communications bus 1004 that is configured to implement connection and communication between these apparatuses. The processor 1001 is configured to execute an executable program such as a computer program stored in the memory 1003. The memory 1003 may include a high-speed random access memory (RAM), or may further include a non-volatile memory, for example, at least one magnetic disk storage. The at least one network interface 1002 (which may be wired or wireless) may implement a communications connection between the authorization server and at least one other network element by using the Internet, a wide area network, a local area network, a metropolitan area network, or the like.

In some implementations, the memory 1003 stores a program 10031. The program 10031 may be executed by the processor 1001. The program includes: receiving a first authorization update request sent by an access device, where the first authorization update request includes a first identifier of the access device; sending a first authorization update response to the access device, where the first authorization update response includes signature request information, and the signature request information instructs the access device to sign verification information; receiving a signature verification request sent by the access device, where the signature verification request includes the first identifier, the verification information, and a signature of the verification information, and the signature of the verification information is generated by the access device by signing the verification information by using a key; obtaining a stored first authorization relationship according to the verification information; determining, according to the signature of the verification information in the received signature verification request and a signature of verification information stored in the first authorization relationship, that the signature of the verification information in the signature verification request is valid; and updating the first authorization relationship according to the first identifier.

Figure 11:
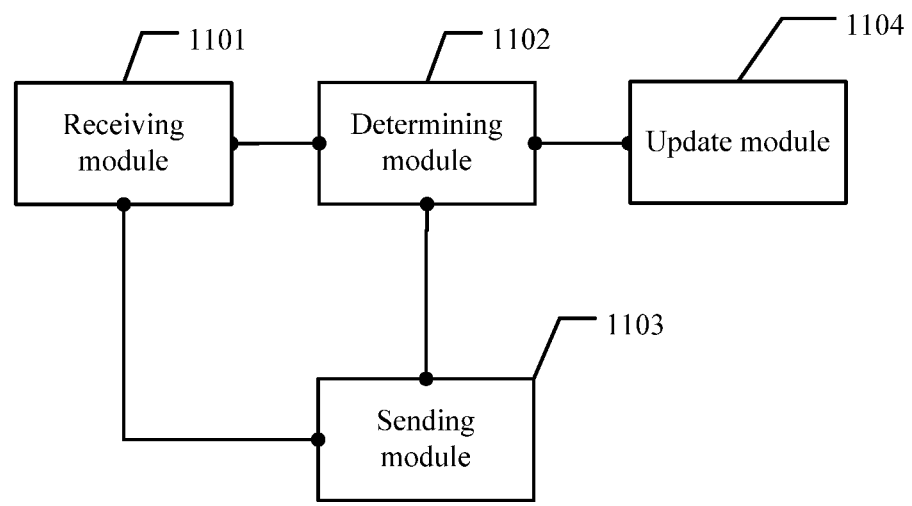
FIG. 11 is a schematic structural diagram of a resource server according to an embodiment of the present invention.

In the embodiments of the present invention, a resource server that belongs to a same inventive concept as the embodiment shown in FIG. 3 is further described. As shown in FIG. 11, FIG. 11 is a schematic structural diagram of a resource server according to an embodiment of the present invention. The resource server may include a receiving module 1101, a determining module 1102, a sending module 1103, and an update module 1104.

The receiving module 1101 is configured to receive a first resource access request sent by an access device, where the first resource access request includes a first identifier of the access device, an identifier of an accessed resource, and an authorization credential.

The determining module 1102 is configured to determine, according to the authorization credential, that a second authorization relationship including the authorization credential and the identifier of the accessed resource exists and that an access device identifier bound in the second authorization relationship is not the first identifier.

The sending module 1103 is configured to send a first resource access response to the access device, where the first resource access response includes signature request information, and the signature request information instructs the access device to sign the authorization credential.

The receiving module 1101 is further configured to receive a second resource access request sent by the access device, where the second resource access request includes the first identifier, the authorization credential, a signature of the authorization credential, and the identifier of the accessed resource, and the signature of the authorization credential is generated by the access device by signing the authorization credential by using a key.

The sending module 1103 is further configured to send a signature data request to an authorization server, where the signature data request includes the authorization credential.

The receiving module 1101 is further configured to receive a signature data response sent by the authorization server, where the signature data response includes a signature of an authorization credential, and the signature of the authorization credential is stored in a first authorization relationship and is obtained by the authorization server according to the authorization credential.

The determining module 1102 is further configured to determine, according to the signature of the authorization credential in the second resource access request and the signature of the authorization credential sent by the authorization server, that the signature of the authorization credential in the second resource access request is valid.

The update module 1104 is configured to update the second authorization relationship according to the first identifier.

Optionally, that the update module is configured to update the second authorization relationship according to the first identifier is specifically: changing a second identifier in the second authorization relationship to the first identifier, where the second identifier is an identifier that has been used by the access device.

The sending module 1103 is further configured to send a second resource access response to the access device after the second authorization relationship is updated according to the first identifier, where the second resource access response includes a resource corresponding to the identifier of the accessed resource.

In an embodiment, the receiving module 1101 is further configured to receive an authorization binding request that is sent after the authorization server performs initial authorization on access of the access device to the resource corresponding to the identifier of the accessed resource, where the authorization binding request includes the second identifier, the authorization credential, and the identifier of the accessed resource. The resource server further includes a storage module, configured to store a correspondence between the second identifier, the authorization credential, and the identifier of the accessed resource as the second authorization relationship.

Figure 12:
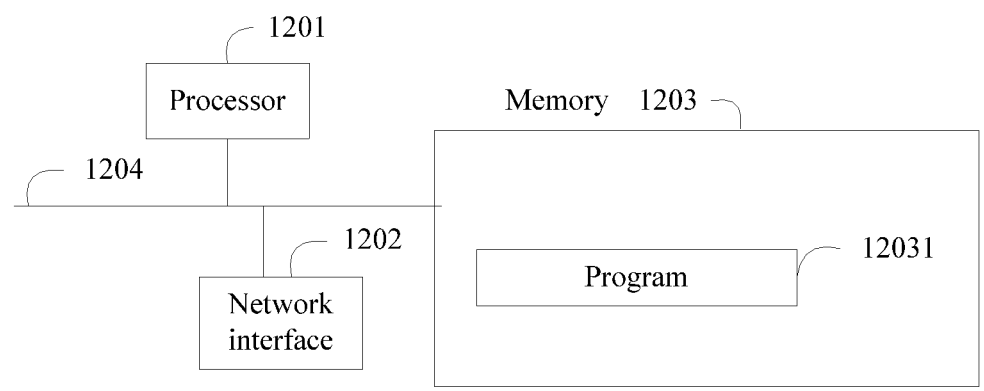
FIG. 12 is a schematic structural diagram of another resource server according to an embodiment of the present invention.

FIG. 12 describes a structure of a resource server according to another embodiment of the present invention. The resource server is configured to perform the authorization processing methods implemented by the resource server in the foregoing embodiments in FIG. 3, FIG. 6A and FIG. 6B, and FIG. 8, and includes at least one processor 1201 (for example, a CPU), at least one network interface 1202 or another communications interface, a memory 1203, and at least one communications bus 1204 that is configured to implement connection and communication between these apparatuses. The processor 1201 is configured to execute an executable program such as a computer program stored in the memory 1203. The memory 1203 may include a high-speed random access memory (RAM), or may further include a non-volatile memory, for example, at least one magnetic disk storage. The at least one network interface 1202 (which may be wired or wireless) may implement a communications connection between the resource server and at least one other network element by using the Internet, a wide area network, a local area network, a metropolitan area network, or the like.

In some implementations, the memory 1203 stores a program 12031. The program 12031 may be executed by the processor 1201. The program includes: receiving a first resource access request sent by an access device, where the first resource access request includes a first identifier of the access device, an identifier of an accessed resource, and an authorization credential; determining, according to the authorization credential, that a second authorization relationship including the authorization credential and the identifier of the accessed resource exists and that an access device identifier bound in the second authorization relationship is not the first identifier; sending a first resource access response to the access device, where the first resource access response includes signature request information, and the signature request information instructs the access device to sign the authorization credential; receiving a second resource access request sent by the access device, where the second resource access request includes the first identifier, the authorization credential, a signature of the authorization credential, and the identifier of the accessed resource, and the signature of the authorization credential is generated by the access device by signing the authorization credential by using a key; sending a signature data request to an authorization server, where the signature data request includes the authorization credential; receiving a signature data response sent by the authorization server, where the signature data response includes a signature of an authorization credential, and the signature of the authorization credential is stored in a first authorization relationship and is obtained by the authorization server according to the authorization credential; determining, according to the signature of the authorization credential in the second resource access request and the signature of the authorization credential sent by the authorization server, that the signature of the authorization credential in the second resource access request is valid; and updating the second authorization relationship according to the first identifier.

It should be noted that, for ease of description, the foregoing method embodiments are described as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

Content such as information exchange and an execution process between the modules in the apparatus and the system is based on a same idea as the method embodiments of the present invention. Therefore, for detailed content, refer to descriptions in the method embodiments of the present invention, and details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

Specific examples are used in this specification to describe the principle and implementation manners of the present invention. The descriptions of the foregoing embodiments are merely intended to help understand the method and idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A method, comprising:
receiving, by an authorization server, a first authorization update request sent by an access device, wherein the first authorization update request comprises a first identifier of the access device;
sending, by the authorization server, a first authorization update response to the access device, wherein the first authorization update response comprises signature request information, and the signature request information instructs the access device to sign verification information;
receiving, by the authorization server, a signature verification request sent by the access device, wherein the signature verification request comprises the first identifier, the verification information, and a first signature of the verification information, and the first signature of the verification information is generated by the access device by signing the verification information using a key;

obtaining, by the authorization server, a stored first authorization relationship according to the received verification information;

determining, by the authorization server according to the first signature of the verification information in the received signature verification request and a second signature of the verification information comprised in the stored first authorization relationship, that the first signature of the verification information in the received signature verification request is valid; and updating, by the authorization server, the first authorization relationship according to the first identifier.

2. The method according to claim 1, wherein before receiving the first authorization update request sent by an access device, the method further comprises:

receiving, by a resource server, a resource access request sent by the access device, wherein the resource access request comprises the first identifier and an identifier of an accessed resource;

determining, by the resource server according to the first identifier and the identifier of the accessed resource, that the access device does not have a right to access a resource corresponding to the identifier of the accessed resource; and rejecting, by the resource server, the request of the access device for accessing the resource corresponding to the identifier of the accessed resource, and sending, to the access device, a resource access response comprising a redirection address, wherein the redirection address is an authorization update port address of the authorization server, so that the access device sends the first authorization update request to the authorization server according to the authorization update port address.

3. The method according to claim 2, wherein before receiving the first authorization update request sent by an access device, the method further comprises:

performing, by the authorization server, initial authorization for access of the access device to the resource corresponding to the identifier of the accessed resource.

4. The method according to claim 3, wherein the verification information is a second identifier stored by the access device and the second signature of the verification information comprised in the stored first authorization relationship is a signature of the second identifier, the signature verification request further comprises a signature of the first identifier, and the signature of the first identifier is generated by the access device by signing the first identifier by using the key; and wherein updating the first authorization relationship according to the first identifier comprises:

changing, by the authorization server, the second signature of the verification information comprised in the stored first authorization relationship to the signature of the first identifier.

5. The method according to claim 4, wherein performing initial authorization for access of the access device to the resource corresponding to the identifier of the accessed resource comprises:

sending, by the authorization server, a resource creation request to the resource server, wherein the resource creation request comprises a preset access control policy and the identifier of the accessed resource, and the preset access control policy comprises the second identifier;

receiving, by the authorization server, a resource creation response sent by the resource server, wherein the resource creation response indicates that the resource server has successfully created an access control policy resource and successfully bound the access control policy resource to the resource corresponding to the identifier of the accessed resource, and the access control policy resource records the preset access control policy;

sending, by the authorization server, a signature request to the access device, wherein the signature request instructs the access device to sign the second identifier;

receiving, by the authorization server, a signature response sent by the access device, wherein the signature response comprises the signature of the second identifier; and storing, by the authorization server, the first authorization relationship, wherein the first authorization relationship comprises a correspondence between the second identifier, the signature of the second identifier, and the identifier of the accessed resource.

6. The method according to claim 5, wherein after the updating the first authorization relationship according to the first identifier, the method further comprises:

sending, by the authorization server, a second authorization update request to the resource server, wherein the second authorization update request comprises the first identifier, the second identifier, and the identifier of the accessed resource.

7. The method according to claim 3, wherein the verification information is an authorization credential, and the first authorization update request further comprises the authorization credential; and wherein obtaining the stored first authorization relationship according to the received verification information comprises:

before sending the first authorization update response to the access device, determining, by the authorization server according to the authorization credential, that the stored first authorization relationship comprising the authorization credential exists.

8. The method according to claim 7, wherein after the updating the first authorization relationship according to the first identifier, the method further comprises:

sending, by the authorization server, a second authorization update request to the resource server, wherein the second authorization update request comprises the first identifier, the authorization credential, and the identifier of the accessed resource.

9. The method according to claim 1, wherein the updating the first authorization relationship according to the first identifier comprises:

changing, by the authorization server, a second identifier in the first authorization relationship to the first identifier, wherein the second identifier was used by the access device.

10. A method, comprising:

receiving a first resource access request sent by an access device, wherein the first resource access request comprises a first identifier of the access device, an identifier of an accessed resource, and an authorization credential;

determining, according to the received authorization credential, that a second authorization relationship exists, and that a second identifier of the access device bound in the second authorization relationship is not the first identifier, wherein the second authorization relationship comprises the authorization credential and the identifier of the accessed resource;

sending a first resource access response to the access device, wherein the first resource access response comprises signature request information, and the signature request information instructs the access device to sign the authorization credential;

receiving a second resource access request sent by the access device, wherein the second resource access request comprises the first identifier, the authorization credential, a first signature of the authorization credential, and the identifier of the accessed resource, and the first signature of the authorization credential is generated by the access device by signing the authorization credential using a key;

sending a signature data request to an authorization server, wherein the signature data request comprises the authorization credential;

receiving a signature data response sent by the authorization server, wherein the signature data response comprises a second signature of an authorization credential, and the second signature of the authorization credential is stored in a first authorization relationship and is obtained by the authorization server according to the authorization credential;

determining, according to the first signature of the authorization credential in the second resource access request and the second signature of the authorization credential sent by the authorization server, that the first signature of the authorization credential in the second resource access request is valid; and updating the second authorization relationship according to the first identifier.

11. The method according to claim 10, wherein after updating the second authorization relationship according to the first identifier, the method further comprises:

sending a second resource access response to the access device, wherein the second resource access response comprises a resource corresponding to the identifier of the accessed resource.

12. The method according to claim 10, wherein updating the second authorization relationship according to the first identifier comprises:

changing the second identifier in the second authorization relationship to the first identifier, wherein the second identifier was used by the access device.

13. The method according to claim 10, wherein after determining that the first signature of the authorization credential in the second resource access request is valid, the method further comprises:

sending a third authorization update request to the authorization server, wherein the third authorization update request comprises the authorization credential and the first identifier; and receiving a third authorization update response sent by the authorization server, wherein the third authorization update response comprises information indicating that the authorization server has successfully performed an authorization update.

14. An authorization server, comprising:
a processor;
a computer-readable storage medium storing a program to be executed by the processor;

a receiver, configured to receive a first authorization update request sent by an access device, wherein the first authorization update request comprises a first identifier of the access device; and a transmitter, configured to send a first authorization update response to the access device, wherein the first authorization update response comprises signature request information, and the signature request information instructs the access device to sign verification information;

wherein the receiver is further configured to receive a signature verification request sent by the access device, wherein the signature verification request comprises the first identifier, the verification information, and a first signature of the verification information, and the first signature of the verification information is generated by the access device by signing the verification information using a key; and wherein the program includes instructions for:
obtaining a stored first authorization relationship according to the verification information in the received signature verification request;

determining, according to the first signature of the verification information in the received signature verification request and a second signature of the verification information comprised in the stored first authorization relationship, that the first signature of the verification information in the signature verification request is valid; and updating the first authorization relationship according to the first identifier.

15. The authorization server according to claim 14, wherein the program further includes instructions for:

changing a second identifier in the first authorization relationship to the first identifier, wherein the second identifier was used by the access device.

16. The authorization server according to claim 15, wherein the program further includes instructions for:

performing initial authorization for access of the access device to a resource corresponding to an identifier of an accessed resource.

17. The authorization server according to claim 16, wherein the verification information is the second identifier stored by the access device and the second signature of the verification information comprised in the stored first authorization relationship is a signature of the second identifier, the signature verification request further comprises a signature of the first identifier, and the signature of the first identifier is generated by the access device by signing the first identifier using the key; and wherein the program further includes instructions for:
changing the second signature of the verification information comprised in the stored first authorization relationship to the signature of the first identifier.

18. The authorization server according to claim 17, wherein the program further includes instructions for:

sending a resource creation request to a resource server, wherein the resource creation request comprises a preset access control policy and the identifier of the accessed resource, and the preset access control policy comprises the second identifier;

receive a resource creation response sent by the resource server, wherein the resource creation response indicates that the resource server has successfully created the access control policy resource and successfully bound the access control policy resource to the resource corresponding to the identifier of the accessed resource, and the access control policy resource records the preset access control policy;

send a signature request to the access device, wherein the signature request instructs the access device to sign the second identifier;

receive a signature response sent by the access device, wherein the signature response comprises the signature of the second identifier; and store the first authorization relationship, wherein the first authorization relationship comprises a correspondence between the second identifier, the signature of the second identifier, and the identifier of the accessed resource.

19. A non-transitory computer readable medium storing a program to be executed by a processor to:

receive, by an authorization server, a first authorization update request sent by an access device, wherein the first authorization update request comprises a first identifier of the access device;

send, by the authorization server, a first authorization update response to the access device, wherein the first authorization update response comprises signature request information, and the signature request information instructs the access device to sign verification information;

receive, by the authorization server, a signature verification request sent by the access device, wherein the signature verification request comprises the first identifier, the verification information, and a first signature of the verification information, and the first signature of the verification information is generated by the access device by signing the verification information using a key;

obtain, by the authorization server, a stored first authorization relationship according to the verification information;

determine, by the authorization server according to the first signature of the verification information in the received signature verification request and a second signature of the verification information stored in the first authorization relationship, that the first signature of the verification information in the signature verification request is valid; and update, by the authorization server, the first authorization relationship according to the first identifier.

20. A non-transitory computer readable medium storing a program to be executed by a processor to:

receive a first resource access request sent by an access device, wherein the first resource access request comprises a first identifier of the access device, an identifier of an accessed resource, and an authorization credential;

determine, according to the authorization credential, that a second authorization relationship exists and that a second identifier of the access device bound in the second authorization relationship is not the first identifier, wherein the second authorization relationship comprises the authorization credential and the identifier of the accessed resource;

send a first resource access response to the access device, wherein the first resource access response comprises signature request information, and the signature request information instructs the access device to sign the authorization credential;

receive a second resource access request sent by the access device, wherein the second resource access request comprises the first identifier, the authorization credential, a first signature of the authorization credential, and the identifier of the accessed resource, and wherein the first signature of the authorization credential is generated by the access device by signing the authorization credential using a key;

send a signature data request to an authorization server, wherein the signature data request comprises the authorization credential;

receive a signature data response sent by the authorization server, wherein the signature data response comprises a second signature of an authorization credential, and the second signature of the authorization credential is stored in a first authorization relationship and is obtained by the authorization server according to the authorization credential;

determine, according to the first signature of the authorization credential in the second resource access request and the second signature of the authorization credential sent by the authorization server, that the first signature of the authorization credential in the second resource access request is valid; and update the second authorization relationship according to the first identifier.

* * * * *